United States Patent

Faberman et al.

[11] Patent Number: 5,978,236
[45] Date of Patent: Nov. 2, 1999

[54] UNINTERRUPTIBLE POWER SUPPLY WITH DIRECTION OF DC ELECTRICAL ENERGY DEPENDING ON PREDETERMINED RATIO

[75] Inventors: Ira S. Faberman, Denver; Floyd Mills, Boulder, both of Colo.

[73] Assignee: Silverline Power Conversion LLC, Boulder, Colo.

[21] Appl. No.: 09/016,170

[22] Filed: Jan. 30, 1998

Related U.S. Application Data

[60] Provisional application No. 60/036,800, Jan. 31, 1997.

[51] Int. Cl.⁶ .................. H02M 5/45; H02J 9/00
[52] U.S. Cl. .................. 363/37; 307/66
[58] Field of Search .................. 363/17, 24, 37, 363/41, 55, 131, 132, 133; 307/64, 66

[56] References Cited

U.S. PATENT DOCUMENTS

| | | | |
|---|---|---|---|
| 3,771,012 | 11/1973 | Niederjohn | 315/86 |
| 4,203,151 | 5/1980 | Baker | 363/43 |
| 4,238,690 | 12/1980 | Clarke | 307/44 |
| 4,395,639 | 7/1983 | Bring | 307/66 |
| 4,564,767 | 1/1986 | Charych | 307/66 |
| 4,663,699 | 5/1987 | Wilkinson | 363/17 |
| 4,672,228 | 6/1987 | Swoboda | 307/66 |
| 4,672,293 | 6/1987 | Crampton | 320/14 |
| 4,709,318 | 11/1987 | Gephart et al. | 363/37 |
| 4,719,550 | 1/1988 | Powell et al. | 363/37 |
| 4,729,803 | 3/1988 | Hindman et al. | 156/48 |
| 4,751,398 | 6/1988 | Ertz, III | 307/66 |
| 4,860,185 | 8/1989 | Brewer et al. | 363/41 |
| 4,885,521 | 12/1989 | Crampton | 320/14 |
| 4,985,819 | 11/1991 | Mori et al. | 363/37 |
| 5,017,800 | 5/1991 | Divan | 307/66 |
| 5,038,267 | 8/1991 | De Donker et al. | 363/89 |
| 5,045,989 | 9/1991 | Higaki et al. | 363/37 |
| 5,057,990 | 10/1991 | Gulcznski | 363/131 |
| 5,119,283 | 6/1992 | Steigerwald et al. | 363/37 |
| 5,126,585 | 6/1992 | Boys | 307/66 |
| 5,140,509 | 8/1992 | Murugan | 363/17 |
| 5,148,043 | 9/1992 | Hirata et al. | 307/66 |
| 5,247,205 | 9/1993 | Mototani et al. | 307/66 |
| 5,255,174 | 10/1993 | Murugan | 363/17 |
| 5,289,045 | 2/1994 | Lavin et al. | 307/64 |
| 5,289,046 | 2/1994 | Gregorich et al. | 307/66 |
| 5,347,164 | 9/1994 | Yeh | 307/66 |
| 5,404,092 | 4/1995 | Gegner | 323/207 |
| 5,440,179 | 8/1995 | Severinsky | 307/66 |
| 5,458,991 | 10/1995 | Severinsky | 429/61 |
| 5,485,365 | 1/1996 | Dan-Harry | 363/132 |
| 5,517,401 | 5/1996 | Kinoshitas et al. | 307/66 |
| 5,612,580 | 3/1997 | Janonis et al. | 307/64 |
| 5,613,135 | 3/1997 | Sakai et al. | 395/800 |
| 5,656,870 | 8/1997 | Turnbull | 307/64 |
| 5,664,118 | 9/1997 | Nishigaki et al. | 395/283 |
| 5,737,208 | 4/1998 | Chen | 323/207 |

FOREIGN PATENT DOCUMENTS

| | | | |
|---|---|---|---|
| 2 577 079 | 8/1986 | France | H02M 3/335 |
| 28591 | 12/1907 | Sweden . | |
| 2 120 474 | 11/1983 | United Kingdom | H02J 9/06 |

*Primary Examiner*—Adolf Deneke Berhane
*Attorney, Agent, or Firm*—Sheridan Ross P.C.

[57] ABSTRACT

An uninterruptible power supply is disclosed in which the backup energy source is connected to the power supply of the protected computer by means of a bi-directional power converter. This converter operates without sensing circuitry, relays, or switches, operating continuously when a load is present in either charging or discharging the backup energy source. This uninterruptible power supply can be placed within the available space of a functioning standard computer power supply enclosure, and may be configured so that it may be replaced during normal computer operation (i.e. it is "hot swappable"). Methods are described to interface the uninterruptible power supply to the computer, providing mutual control and communication. The device may be also used to power devices requiring external DC power, which are commonly found in association with computer operations.

42 Claims, 9 Drawing Sheets

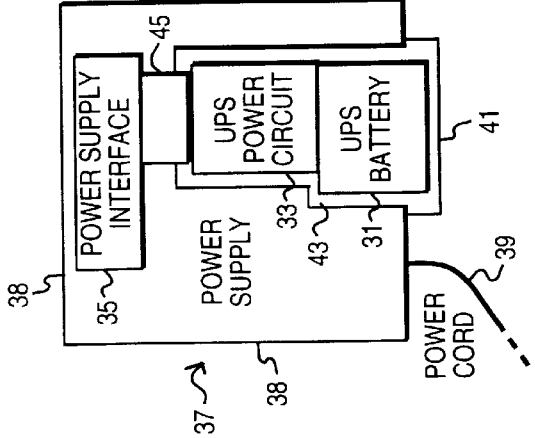
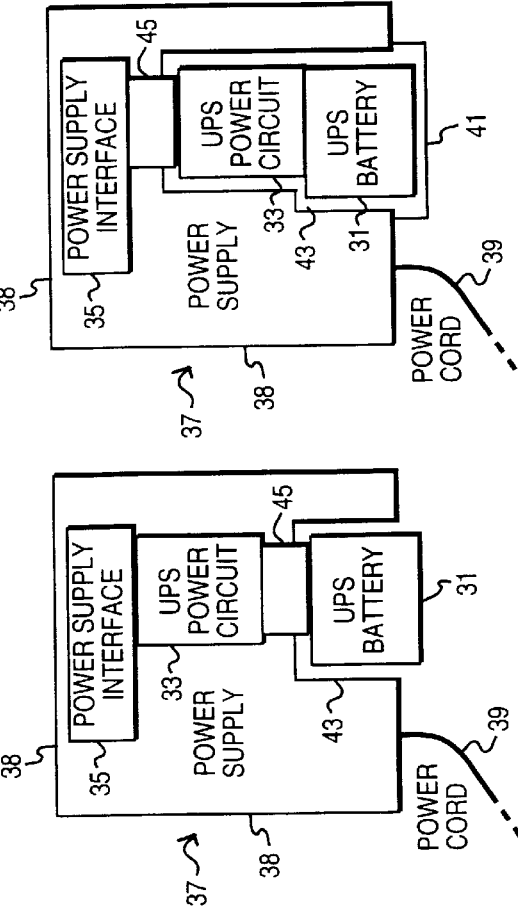
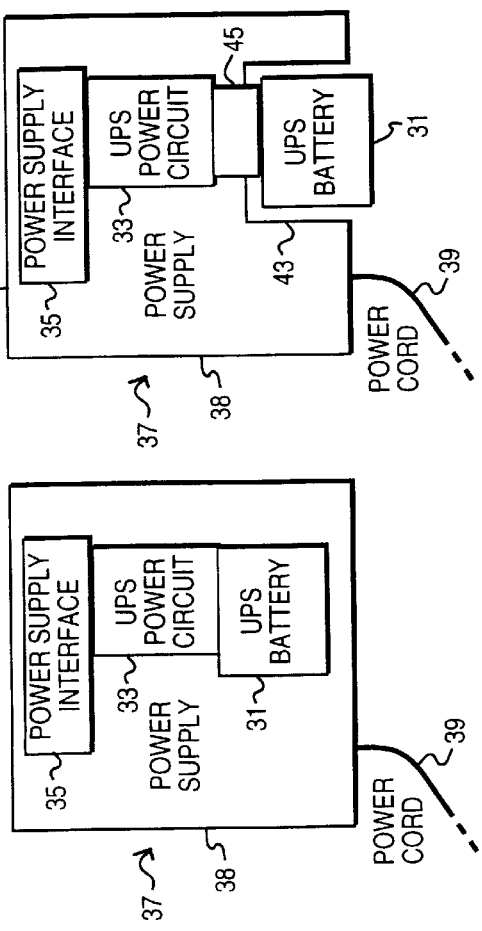
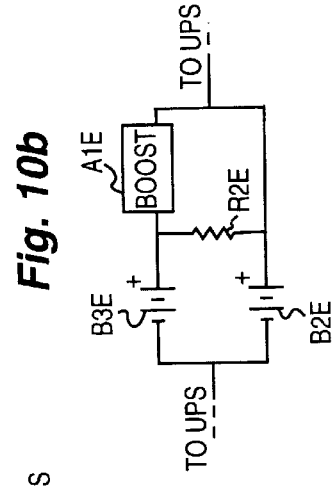
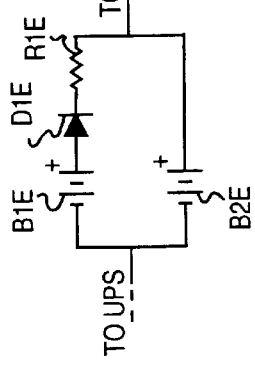
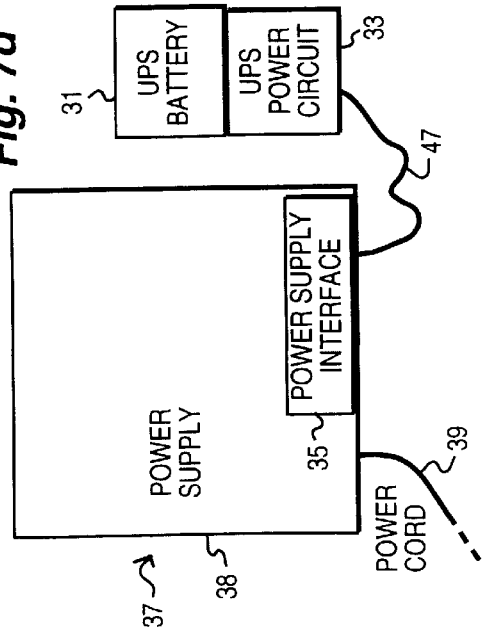

UNINTERRUPTIBLE POWER SUPPLY WITH DIRECTION OF DC ELECTRICAL ENERGY DEPENDING ON PREDETERMINED RATIO

CROSS-REFERENCE TO RELATED PATENT APPLICATIONS

This application is related to and claims priority from Provisional Patent Application No. 60/036,800, filed Jan. 31, 1997, titled "Uninterruptible Power Supply," the contents of which are incorporated herein by reference.

TECHNICAL FIELD

This invention relates to uninterruptible power supplies.

BACKGROUND ART

Electronic equipment which is state dependent and which derives electrical power from line voltage provided by utility companies over a distribution grid is fundamentally vulnerable to system damage and data loss through the loss of continuity of power. This is not a new problem and solutions in the form of uninterruptible power supplies that stabilize the line power reaching sensitive equipment have been available for many years. These devices fall into two categories: the standby power supply and the true uninterruptible power; supply. Each of these categories of device addresses the same problem, and in the vernacular both have come to be known as an uninterruptible power supply (UPS). A commonality of these two forms is that both take power from the AC line, and both output power functionally equivalent to that of the AC line.

In the standby power supply, AC line power is shunted directly to the output so long as good line power is present. Then, in response to sensing the absence of good AC line power, the UPS manufactures stand-by power from a battery bank and feeds it to the output. The true uninterruptible power supply has a central DC bus which is supplied by both battery power and/or rectified AC line current when present. Power from the central DC bus is continuously being inverted and supplied to the output of the UPS. The greater stability of the output due to complete independence from fluctuations of line voltage, together with the elimination of line power quality sensing circuitry make the true uninterruptible power supply a more dependable form of UPS backup than the standby power supply.

Desktop and small computer systems today all have integrated DC power supplies built into them. These supplies are designed to accept AC line voltage and convert it into various line-isolated, DC outputs required by the computer hardware. Today, small computer systems and the UPS's that are often used to provide stability of operation are generally separate components or entities. That is, line power from the mains is fed through a physically and electronically separate UPS, whether a standby power supply or a true uninterruptible power supply. The UPS receives AC input, and provides AC output, often with an intermediate stage in which the power is converted to a DC voltage. This AC output of the UPS is then fed into the normal AC input of the computer system. This arrangement has many inefficiencies, most notably in that the UPS must have separate power supply electronics which often mimic those already present in the computer power supply.

External UPS's have a number of disadvantages in their use. For example, these systems are inherently expensive in the use of redundant parts (electronics, connectors and enclosures). The additional number of power conversions also involve additional power losses. Furthermore, these external UPS systems require the use of additional desktop or floor space, along with the need for additional power cables to connect them to the computer.

Finally, it is of benefit for the computer to have knowledge about the loss of mains power, so that steps may be taken to safeguard information on the computer from eventual loss when the battery supply in the UPS is exhausted. Without some form of explicit communication about the loss of mains power, the computer receiving power from the UPS is not alerted to the potential for eventual loss of power due to battery exhaustion. In order to compensate for this shortcoming, external UPS's often have serial communications capabilities, which are connected through an external serial port on the computer system. However, since many computer systems are delivered with only one or possibly two external serial ports, this communications link between the computer and the UPS consumes a scarce resource.

A UPS internal to the computer would be of general usefulness, but previous attempts have run into a number of technological barriers. For example, computer enclosures are often compact, and the large batteries of most UPS's would not easily fit within their confines. Furthermore, if the UPS is internal to the computer but external to the computer power supply, power from the UPS must be fed back to the power supply so as to reintegrate with normal computer electronics. In addition, the internal UPS is at a disadvantage because the batteries of the UPS must be either accessible for exchange when the batteries exceed their operational life (especially with lead-acid batteries, which have limited lifetimes), or when the computer is disposed of, because of the toxic materials used in many batteries. Another limiting characteristic of an internal UPS is that its batteries are generally not "hot swappable," meaning that the batteries cannot be replaced without the need to power-down the computer. This capability is of particular interest to server computers, which due to their use by a large number of users, must be maintained in the operational state.

In order to address these problems with internal UPS's, attempts have been made to integrate a UPS into computer power supplies. In such an arrangement, mechanical or electrical components of the power supply may be used for the UPS, and the UPS can easily output power into the normal power output of the power supply.

U.S. Pat. No. 5,289,045 to Lavin et al. and U.S. Pat. No. 4,860,185 to Brewer et al. are among prior art methods of incorporating UPS functions into computer power supplies. These patents teach devices in which the UPS circuitry connects directly into the AC-DC conversion electronics of the computer power supply. These devices, however, have numerous disadvantages, such as extensive required modifications of computer power supply circuitry. Furthermore, these devices are not true uninterruptible power supplies, but are switched into the power circuit when a fault is detected. In addition, only minimal power is made available to recharge the UPS batteries after discharge, leaving a time window during which the computer system is vulnerable to subsequent power outages.

It was our intention to create a true uninterruptible power supply that can fit within existing computer power supplies, and which is inexpensive to manufacture, provides sufficient computer system operational time under UPS power so that important data can be safely stored, and which has other features widely desired by users of UPS systems and which are not currently available. It was our intention to solve the problems of the prior art that gave rise to the current invention.

SUMMARY OF THE INVENTION

It is an object of the present invention to provide a UPS that is located primarily within the enclosure of a computer power supply.

It is in addition an object of the present invention to provide a UPS that may be installed without opening the computer enclosure.

It is another object of the present invention to provide a UPS which is "hot-swappable."

It is still another object of the present invention to provide a UPS which is inexpensive to operate.

It is further an object of the present invention to provide a UPS with a limited number of electrical connections with the computer supply in which it is located.

It is also an object of the present invention to provide a UPS which is a true, continuously functioning UPS.

It is additionally an object of the present invention to provide a UPS whose batteries can be charged quickly so that the UPS may return to its protective state shortly after its batteries are depleted.

It is still further an object of the present invention to provide a UPS which communicates within the computer enclosure with the computer that it is protecting.

It is yet another object of the present invention to provide a UPS which alerts the user that it is functioning.

It is still further an object of the present invention to provide a UPS which provides electrical energy for computer accessory devices external to the computer.

It is yet further an object of the present invention to provide a UPS which alerts the user if the computer power supply cooling system fails to operate.

Additional objects, advantages and novel features of this invention shall be set forth in part in the description that follows, and will become apparent to those skilled in the art upon examination of the following specification or may be learned through the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described therein, the present invention is directed to an uninterruptible power supply for a source of DC power comprising a restorable source of stored energy wherein the energy may be released and restored in DC electrical form and a bi-directional power converter to couple the stored energy source to the DC power source. The power converter continuously operates, directing energy either toward the source of DC power from the source of stored energy or from the source of stored energy to the source of DC power. The direction of electrical energy flow is determined by the deviation of the ratio of the potential of the source of DC power and the potential of the source of stored energy from a predetermined ratio.

The restorable source of stored energy may be a rechargeable battery. Also, the source of DC power may be the source of DC power at the input of a switching power supply.

The energy directed between the source of DC power and the source of stored energy may be in the form of electrical current controllable in either direction. The electrical current may be controlled through means of pulse width modulation, duty cycle modulation at substantially constant frequency of substantially constant pulse widths, or through frequency modulation of substantially constant pulse widths.

The magnitude of electrical current available in either direction may be greater than or equal to the inverse of the predetermined ratio of the potential of the source of DC power and the potential of the source of stored energy used in determining current direction. The magnitude of electrical current that can flow in the direction of the source of stored energy may be greater than 10 amperes.

The restorable source of stored energy or the bi-directional power converter may be disconnected from the bi-directional power converter without interrupting the proper operation of devices that draw power from the source of DC power. At the connection between the bi-directional power converter and the DC power source, the bi-directional power converter may contain less than 75% of the stored energy of the DC power source proper.

The source of stored energy may be maintained in parallel with a second source of stored energy. Also, the second source of stored energy may be connected through a unidirectional current device.

The source of DC power may be a computer power supply located in a computer. Additionally, the uninterruptible power supply may be contained within the enclosure of the computer power supply. Furthermore, the uninterruptible power supply may detect inadequate cooling within the computer power supply within which it is contained, and may also cause an alert to be produced that is from the set comprising audible and visual alerts.

The uninterruptible power supply or the restorable source of stored energy may be removable from computer power supply while the power supply is energized. Also, the uninterruptible power supply or the restorable source of stored energy may be accessible from the outside of the computer.

The source of DC power may be the unfiltered output of a switching power supply. Also, the energy directed towards the restorable source of stored energy may be derived from the unfiltered output of a winding of the switching power supply transformer.

A portion of the energy may be diverted from the bi-directional power converter and may be adapted for use by external electrical devices. The diversion of power may be accomplished by using at least one winding on a transformer.

A single electronic component may be used concurrently as a fuse and as a resistor developing a voltage proportional to current flowing in the restorable source of stored energy. This proportional voltage may be used in regulating the current restoring the energy to the restorable source, in detecting the direction of current in the restorable source of stored energy, in detecting whether the level of current flowing in the restorable source of stored energy is at least a predetermined level of current, or in modifying a predetermined value representing the approach of energy depletion of the restorable source of stored energy.

The operation may not be initiated unless voltage is present at the source of DC power and a signal from the computer representing energization of the power equipment is present. Also, the operation may be terminated when the signal representing energization of the power equipment is absent.

Communication from the uninterruptible power supply to the computer motherboard may be mediated through a cable intended for connection with an internal peripheral. Also, communication from the uninterruptible power supply to the computer motherboard may be mediated by a connection in parallel with a mechanical switch used to initiate system shutdown.

The power supply may generate audio signals that are enunciated by a computer system speaker, and the wires connecting to the speaker may be in parallel with other wires connected to the speaker.

The present invention is also related to a method of providing redundant power to a source of DC power. The method includes the steps of providing a source of restorable stored energy and coupling the restorable stored energy source to the DC power source in a manner to direct energy either toward the source of DC power from the source of stored energy or from the source of stored energy to the source of DC power, wherein the direction of electrical energy flow is determined by the deviation of the ratio of the potential of the source of DC power and the potential of the source of stored energy from a predetermined ratio.

The present invention is yet also related to an apparatus for providing redundant power to a source of DC power comprising means for providing a source of restorable stored energy and means for coupling the restorable stored energy source to the DC power source in a manner to direct energy either toward the source of DC power from the source of stored energy or from the source of stored energy to the source of DC power, wherein the direction of electrical energy flow is determined by the deviation of the ratio of the potential of the source of DC power and the potential of the source of stored energy from a predetermined ratio.

BRIEF DESCRIPTION OF THE DRAWINGS

FIG. 3a is a simplified schematic diagram of a bi-directional power converter as in FIG. 1, that shows the addition of circuitry designed to limit the charge reaching the battery.

FIG. 3b is a timing diagram that presents the signals that regulate current flow in the circuit of FIG. 3a.

FIG. 4 is a more detailed schematic of an uninterruptible power supply featuring a bi-directional power converter as in FIG. 3a.

FIG. 7a through FIG. 7d are block diagrams of a power supply for electronic equipment with varying degrees of physical integration with a UPS and its batteries.

FIG. 10a is a schematic showing a main storage battery connected in parallel with a maintenance battery to extend the shelf life of the main storage battery.

FIG. 10b is a schematic showing a main storage battery connected in parallel with a maintenance battery, as in FIG. 10a, except that the maintenance battery in this case is a rechargeable battery.

BEST MODE FOR CARRYING-OUT THE INVENTION

Functional Overview

The uninterruptible power supply (UPS) of the present invention serves to protect electronic equipment during power outages, by supplying electrical power to the equipment from a source of stored energy (generally a chemical battery). While the equipment protected by the UPS is often a computer, it may also include other important electronic devices, including medical equipment, cash registers, or telecommunications equipment. While many devices would benefit from the invention, for purposes of discussion, the use of the invention will be described primarily with respect to a computer.

The UPS of the present invention includes a bi-directional power converter that converts a first DC voltage to a second DC voltage, or a second DC voltage to a first DC voltage. This converter operates without sensing circuitry, relays, switches or modifications. The present invention further provides proportional current control to regulate current to a load.

Figure 1:
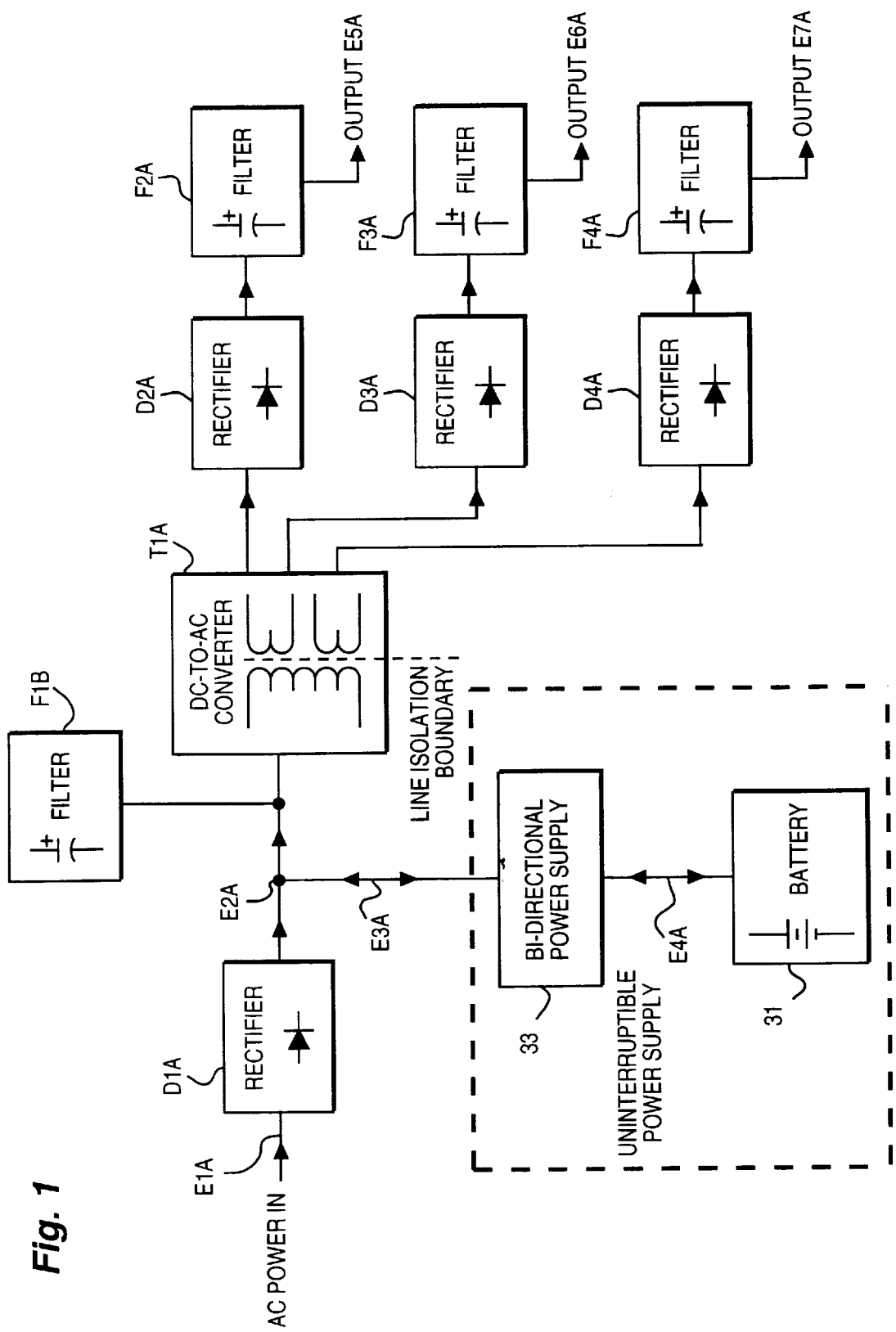
FIG. 1 is a block diagram of a first embodiment of the present invention, applied to a typical power supply employing AC current at the source and delivering DC power to three separate outputs.

FIG. 1 is a block diagram of a typical power supply employing AC current at the source, and delivering DC power to three separate outputs, in which a bi-directional power converter is used. As can be seen, the input AC voltage at an input node E1A is rectified by a rectifier D1A and filtered by a filter F1A at a node E2A, also commonly known as the "DC rail," where it becomes the source of energy for a DC-to-AC converter T1A. The DC-to-AC converter T1A can be of any applicable topology which can convert the voltage at E2A to a voltage useful to the loads at one or more outputs E5A, E6A, and E7A, rectified by a multiplicity of rectifiers D2A, D3A, and D4A and filtered by filters F2A, F3A, F4A.

For the sake of example, the AC input voltage at E1A may be assumed to be a common household voltage of 120 VAC. The rectification section converts this to a DC voltage at the DC rail E2A of approximately 330 VDC. The DC-to-AC T1A converter is designed to provide a useable output with an input voltage on the DC rail E2A that may vary over a range of voltages. Assume for this example that the DC-to-AC converter T1A can accommodate a range of voltages from 330 VDC to 230 VDC and still provide an output useful to the load.

A bi-directional power converter 33, also known as the UPS circuitry, is, in this example, assumed to have a nominal voltage conversion ratio of 1:30. Thus, the converter 33 can convert a nominal voltage of 8 VDC at a node E4A to 240 VDC. In like fashion, with this fixed ratio, a voltage appearing at a node E3A of 330 VDC as supplied by the main source of power would be converted to a voltage of 11 VDC at the node E4A. If a UPS battery 31 with a nominal terminal voltage of 8 volts is then attached at the node E4A, it will be charged by the higher potential seen at the node E4A caused by the voltage at the node E2A when the main power at the node E1A is energized.

Now, when the main power at the input node E1A is interrupted, the bi-directional power converter B1A converts the potential of battery B2A of 8 VDC at the node E4A to 240 VDC at the node E2A, thus supplying continuous power to DC-to-AC converter T1A, even with the interruption of the mains power input.

Figure 2:
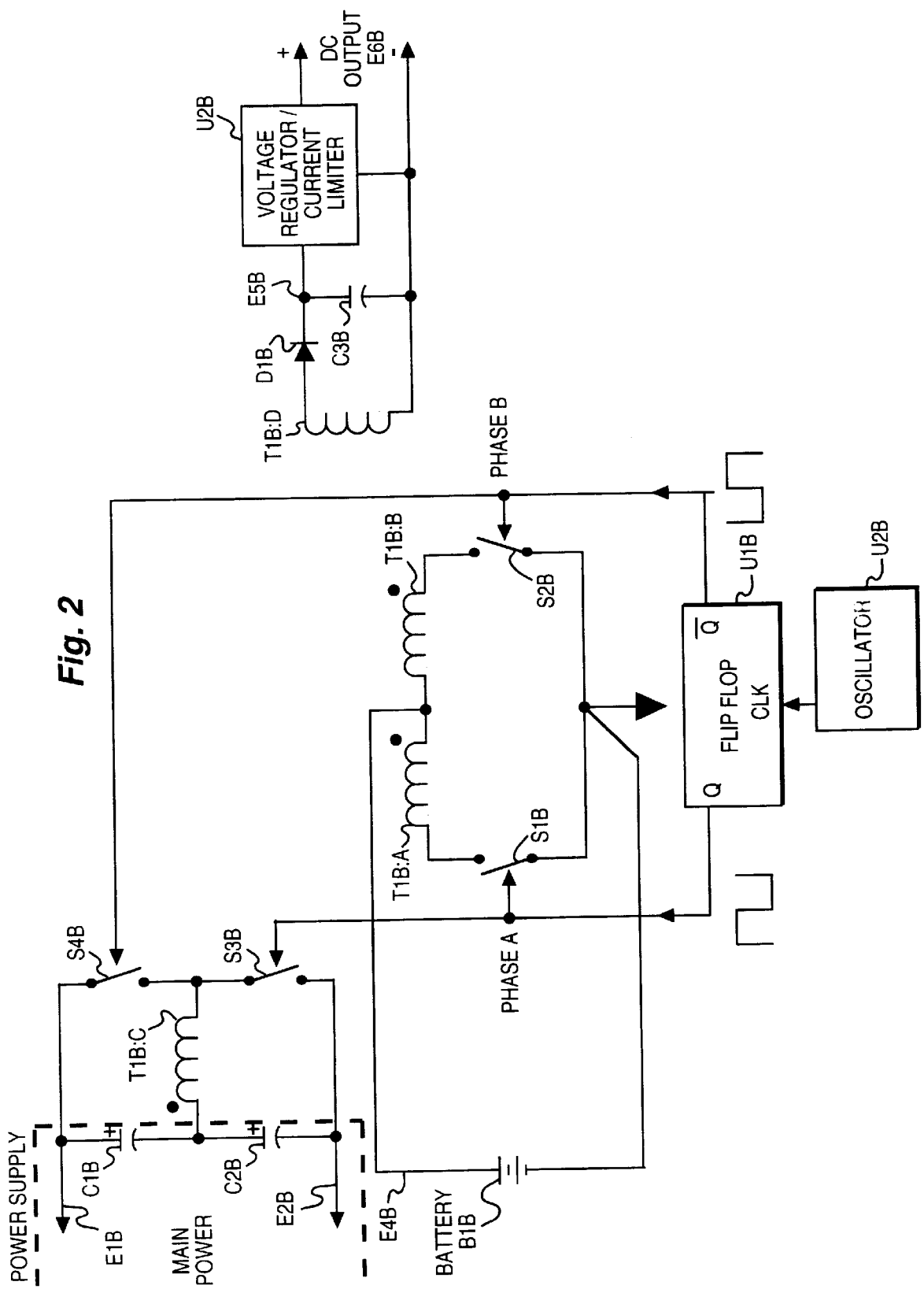
FIG. 2 is a simplified schematic diagram of a bi-directional power converter as in FIG. 1, also including circuitry for providing auxiliary DC voltage output.

FIG. 2 is a simplified schematic diagram of a bi-directional power converter. An oscillator U2B output is divided by a flip-flop U1B into two complementary driving signals. A multiplicity of switches S1B, S2B, S3B and S4B are bi-directional switches responsive to these drive signals such that a positive signal causes the switch to close. The switches S1B and S2B are closed alternately by signals phase A and phase B from the flip-flop U1B output. The switches S1B and S2B alternately impress a battery B1B voltage E4B across transformer windings T1B:A and T1B:B respectively, such as to cause an alternating polarity of flux in the core of the transformer T1B and therefore an alternating polarity of voltage across the transformer winding T1B:C.

For the purpose of illustration, assume that the main power source, which normally exists across a pair of nodes E1B and E2B, has been interrupted. When the switch S1B closes, a voltage is impressed across the transformer winding T1B:A with a polarity such that the polarity mark at the transformer winding T1B:A is positive. The voltage induced on the transformer winding T1B:C is likewise positive at the polarity mark. The switch S3B is closed synchronously with the switch S1B, connecting the transformer winding T1B:C across a capacitor C2B and charging the capacitor C2B to the battery voltage E4B multiplied by the turns ratio of the transformer T1B. In this example, let the battery voltage E4B equal 8 VDC and the turns ratio of the transformer T1B equal 1:15. Therefore the voltage impressed on the capacitor C2B is 8×15=120 VDC. During the second half of the cycle, the switches S1B and S3B open and the switches S2B and S4B are closed. This reverses the polarity of all windings of the transformer T1B, connects a capacitor C1B across the transformer winding T1B:C and charges the capacitor C1B to 120 VDC. The combined voltages on the capacitors C1B and C2B equals 240 VDC (120 VDC plus 120 VDC).

Now assume that the main power has returned and has charged the capacitors C1B and C2B to a combined total of 330 VDC. Assume also that the voltage at the junction of C1B and C2B is 50% of the main power voltage or 165 VDC. The switches S1B and S3B then close. The switch S3B connects the transformer winding T1B:C across the capacitor C2B and impresses 165 VDC across the transformer winding T1B:C. The transformer winding T1B:A is also connected across a battery B1B by the switch S1. The voltage appearing across the transformer winding T1B:A is 165 VDC/15=11 VDC. On the next half cycle, the switches S2B and S4B close, reversing all polarities on the transformer T1B and connecting the transformer winding T1B:B across the battery. This voltage is higher than the natural terminal voltage of the battery B1B voltage (8 VDC) and therefore charges the battery B1B. Leakage inductance designed into the transformer T1 between the windings limits the charging current.

FIG. 3a is a simplified schematic that shows the addition of circuitry designed to actively limit the charge reaching the battery B1B, and is otherwise similar to the circuitry shown in FIG. 2. A pulse width modulator U2C has been introduced between the switches S1B and S3B, and also between the switches S2B and S4B. The modulator U2C is responsive to the output of an error amplifier U1C that in turn is responsive to the difference between the battery B1B voltage E4B and a reference voltage atop the diode D1C. When the main source of power is present across nodes E1B and E2B, the battery B1B will charge as shown by FIG. 2, until the battery B1B voltage E4B exceeds the reference voltage atop the diode D1C. The error amplifier U1C then causes the pulse width modulator U2C to reduce the conduction duration of the switches S3B and S4B. The reduced conduction time reduces the average current reaching the battery B1B and therefore limits the charge. FIG. 3b is a timing diagram that presents with a common horizontal time axis the signals at the phases A, A1, B, and B1, that regulate current flow in the circuit.

The additional circuitry shown in FIG. 3a is for illustration purposes only. It will be obvious to those skilled in the art that different types of batteries (e.g. lead-acid or nickel-cadmium batteries) require different charging profiles. FIG. 3a only demonstrates the ability of the bi-directional power converter to control the flow of current, in this case as a function of battery voltage, although many other battery parameters such as charge current or temperature may be so regulated. In similar fashion, the switches S3B and S4B could be modulated in response to the output current requirement at the node E2B when the main power is interrupted. In FIG. 3a, the regulation scheme affects only the current charging the battery. It should be apparent to those skilled in the art that a similar scheme can be implemented to limit the current flowing from the battery. These two schemes can co-exist within the same circuit, such that current flowing in either direction may be modulated.

It should be noted that within the spirit of the present invention, the pulse width modulator U2C could be replaced with a duty-cycle modulator, which in response to signals from the error amplifier U1C, determines the ratio of pulses of substantially constant frequency and pulse width to absent pulses in a pulse train. Alternatively, current can be controlled by many other means known in prior art, including frequency modulation, wherein the circuit contains reactive and/or resonant components placed in series or in shunt with the load and wherein the range of frequency modulation substantively modulates the reactance of the components. One example of frequency-modulated control would be the replacement of oscillator U2B with a variable-frequency oscillator responsive to the error amplifier U1C. To provide control of current relative to frequency, an inductor may be placed in series with the transformer winding T1B:C, and a capacitor may be placed in shunt with the transformer winding T1B:C. The values of the inductor and capacitor are chosen to be in electrical resonance at or below the minimum frequency generated by the variable frequency oscillator. It should be apparent to those skilled in the art that this capacitor and inductor form a low-pass filter, and that an increase in frequency of the variable frequency oscillator provides an increase in impedance of the inductor and a simultaneous decrease in capacitance of the capacitor, shunting energy away from the transformer winding T1B:C, and thus decreasing the flow of current into the battery B1B.

DETAILED DESCRIPTION OF THE PRESENT INVENTION

Figure 4:
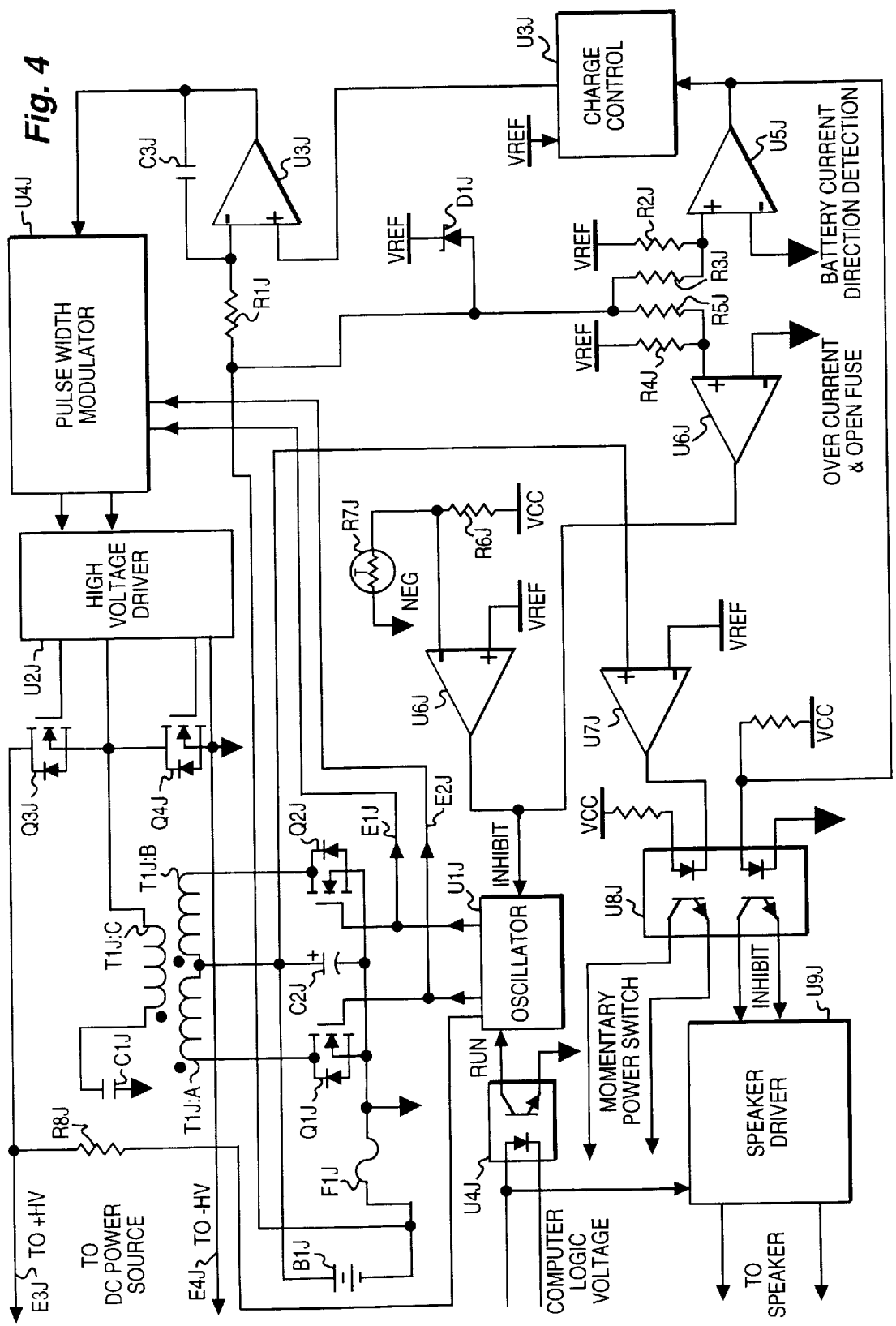

FIG. 4 is a more detailed schematic of an uninterruptible power supply featuring a bi-directional power converter according to the present invention. An oscillator U1J drives power mosfets Q1J and Q2J into conduction alternately. Full pulse width signals at the nodes E1J and E2J are transmitted to a pulse width modulator U4J. The pulse width modulator U4J transmits drive signals to a high voltage driver U2J synchronously with the signals of E1J and E2J, which alternately causes power mosfets Q3J and Q4J to initiate conduction synchronously with the mosfets Q1J and Q2J. The arrangement of polarities of the windings of a transformer T1J, in conjunction with the drive signal polarities reaching the power mosfets Q1J, Q2J, Q3J and Q4J, are such that the conduction of each pair of transistors is in phase with the voltage appearing across the windings of the transformer T1J. Thus, when the mosfet Q1J is conducting, the mosfet Q3J is also conducting. Also, when mosfet Q2J is conducting, Q4J is conducting.

When a voltage is present across a battery B1J, the mosfets Q1J and Q2J impress the voltage on the battery B1J across the transformer windings T1J:A and T1J:B alternately. The peak voltage on the transformer windings T1J:A and T1J:B multiplied by the turns ratio of T1J:A to T1J:C, appear as the peak to peak voltage on the a transformer winding T1J:C. The body diodes that are an inherent part of the mosfets Q3J and Q4J conduct alternately, rectifying the peak to peak voltage on the transformer winding T1J:C to the DC power source. An averaging capacitor C1J provides a DC potential to the transformer winding T1J:C that is equal to one-half the voltage of the DC power source across nodes E3J and E4J. If a voltage is present on the DC power source that is absent or less than that which would be rectified through the mosfets Q3J and Q4J, energy will flow into the DC power source. Because the mosfets Q3J and Q4J are conducting synchronously with the mosfets Q1J and Q2J, and because mosfets in conduction conduct in both polarities of current, the body diodes of the mosfets Q3J and Q4J are shunted by their respective mosfet channel's conduction and rectification efficiency is improved.

When a voltage is present across the DC power source at the nodes E3J and E4J, the mosfets Q3J and Q4J impress the voltage across the transformer winding T1J:C. The peak-to-peak voltage on the transformer winding T1J:C multiplied by the turns ratio of the transformer windings T1J:C to T1J:A appears as the peak voltage on the transformer windings T1J:A and T1J:B respectively. The body diodes that are part of the mosfets Q1J and Q2J conduct alternately, rectifying the peak voltage on the transformer windings T1J:A and T1J:B to the battery B1J. If a voltage is present on the battery B1J that is less than that which would be rectified through the mosfets Q1J and Q2J, energy will flow into the battery B1J. Because the mosfets Q1J and Q2J are conducting synchronously with the mosfets Q3J and Q4J, and because mosfets in conduction conduct in both polarities of current, the body diodes of the mosfets Q1J and Q2J are shunted by their respective mosfet channel's conduction and rectification efficiency is improved.

Thus it can be seen that the circuit readily converts DC-to-DC voltages in either direction. The direction of energy flow is determined by the ratio of the DC voltages compared to the internal ratio of conversion that is determined by the turns ratio of the transformer T1J.

Modulation of the magnitude of current flowing into the battery B1J is accomplished by regulating the voltage across a combined fuse and current sensing resistor F1J. An error amplifier U3J compares this voltage with a reference voltage supplied by the error amplifier U3J charge controller. The error amplifier U3J and bandwidth determining components, comprising a resistor R1J and a capacitor C3, feed an error signal to the pulse width modulator U4J that acts to shorten, as needed, the width of pulses arriving from the oscillator U1J via the lines E1J and E2J. The resultant modified pulses are fed to the high voltage driver U2J and output to control the conduction times of the power mosfets Q3J and Q4J. The conduction times of the power mosfets Q3J and Q4J modulate the current rectified in the power mosfets Q1J and Q2J and fed to the battery B1J. Thereby the current flowing into the battery B1J is regulated.

When energy is flowing out of the battery B1J, the polarity of current will be in opposition to that of when the battery B1J is receiving a charge. This polarity of current develops a second polarity of voltage across the fuse F1J. This polarity change is sensed by a comparator U5J. Voltage divider resistors R2J and R3J provide a voltage that is the algebraic sum of a reference voltage and the voltage across the fuse F1J. When current is flowing from the battery B1J this summed voltage is below zero (ground potential), the comparator U5J output changes state. This resets the control circuit U3J and releases the inhibit command seen by a speaker driver U9J through an optoisolator U8J. The speaker driver U9J provides audio driving signals that annunciate through a speaker, alerting the user to the presence of a power fault, and indicating the action of the UPS to protect the volatile information on the computer.

A comparator U6J senses the current flowing out of the battery B1J as developed by the current sense resistor and fuse F1J. The resistor R4J and a resistor R5J form a voltage divider that provides to the comparator U6J the algebraic sum of a reference voltage and the voltage developed across the fuse F1. When current flowing from the battery B1J exceeds a predetermined value, this voltage is equal to or more negative than zero, the comparator U6J output changes state. The comparator U6J output then inhibits the oscillator U1J, ceasing further operation and terminating any further excessive current. Furthermore, if the fuse F1J opens due to excessive current, the voltage at the junction of the resistors R4J and R5J will be substantially negative, also changing the state of the comparator U6J output and inhibiting further circuit operation.

Circuit operation will also be inhibited if the comparator U6J output changes state due to an over temperature condition as sensed by a voltage divider comprised of a resistor R6J and a thermistor R7J, which is physically positioned to sense temperature. When the comparator U6J output changes state due to an over temperature condition, further operation is inhibited until the sensed temperature decreases.

A comparator U7J senses the voltage across the battery B1J. When energy is flowing out of the battery B1J, the voltage across the battery B1J decreases. At some point, the voltage may be said to indicate that little energy remains in the battery B1J. The comparator U7J senses this point by comparing this voltage with the voltage reference atop a diode D1J (VREF). When the comparator U7J senses that the battery B1J voltage is equal to or less than VREF, the comparator U7J output changes state. This provides a signal to other equipment via the optoisolator U8J and initiates the start of orderly system shutdown procedures before the battery B1J is completely exhausted.

The voltage across the battery B1J is both a function of the remaining energy in the battery B1J and the discharge current depressing the apparent voltage across it due to the internal impedance of the battery B1J. This implies that a range of voltages may be detected across the battery B1J for the same remaining energy, owing to differences in discharge current from event to event. Since the fuse F1J develops a voltage proportional to this same current, the voltage across the fuse F1J can be used to compensate for the internal impedance of the battery B1J by adjusting the comparator U7J detection point for a range of discharge currents. To accomplish this, the anode of the reference diode D1 is connected to the current sense side of the fuse F1J. The polarity of voltage across the fuse F1J is such that an increase in discharge current produces an increase in the negative magnitude of the voltage. This negative voltage, proportional to the current in the battery B1J is level shifted by the diode D1J and subtracts from the reference voltage used as a comparison basis by the comparator U7J to determine the onset of energy depletion. By previously knowing the average internal impedance of the battery B1J, the relative magnitude of circuit values may be set to compensate for the internal impedance of the battery B1J. This technique depresses the trip point of the comparator U7J in the same proportion to current as the voltage of the battery B1J is depressed at that current.

A resistor R8J establishes a small current that starts the oscillator U1J. Therefore, the oscillator U1J will not start unless the DC power source is present. An optoisolator U4J receives a signal from powered equipment and allows the oscillator U1J to operate only if the signal is present indicating that the equipment is energized.

A Second Embodiment of the Present Invention

The first embodiment of the present invention uses a bi-directional power converter which connects to the computer power supply at the rectified input of the switching power supply. In the second embodiment, a similar scheme involving bi-directional power conversion is used, however the point of connection between the bi-directional power converter and the computer power supply is now an unfiltered output of the switching power supply.

Figure 5:
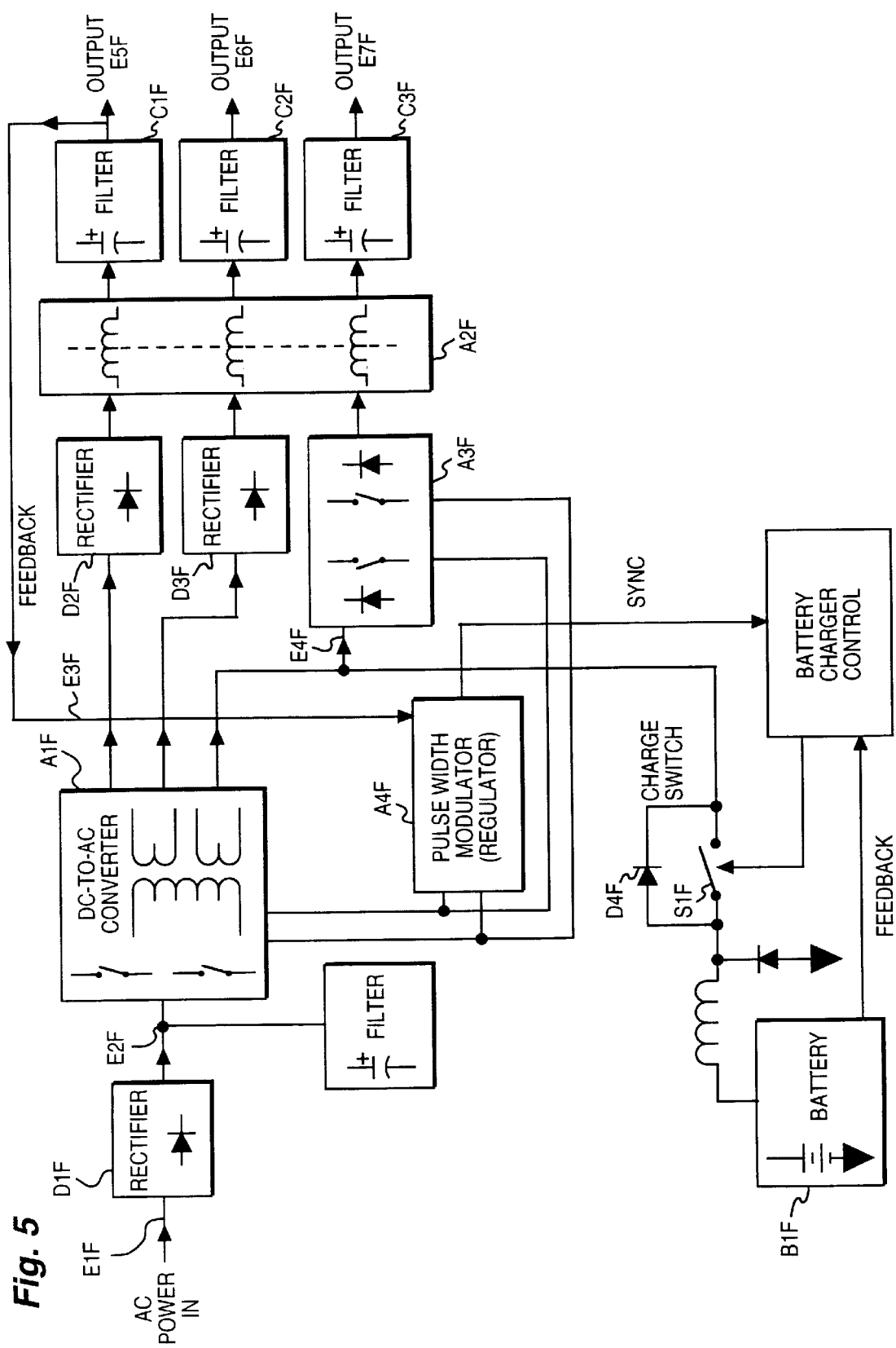
FIG. 5 is a block diagram of a second embodiment of the present.

FIG. 5 is a block diagram of a multiple output power supply operating from the mains and containing an integrated UPS. Operation proceeds as would be normal for any off-line power supply unless the input AC power droops or fails completely. When this occurs, the integrated UPS automatically supplies energy to the system without the need for sensing and change over circuits.

Voltage at a node E2F is the rectified and rough filtered product of a line voltage E1F through a rectifier D1F. Voltage at the node E2F is not regulated and is subject to changes proportional to those affecting the peak value of voltage at the input E1F. The DC-to-AC converter A1F contains a pair of high-speed electronic switches and a transformer. The transformer converts the high frequency, high voltage from the switches to other voltages that are useful for a given load. A second purpose of the transformer may be to isolate the output voltages available to the load from the potential of the mains. For convenience sake, assume that the outputs of the DC-to-AC converter A1F are low voltages suitable for use by electronic equipment isolated from the power line.

The resultant output voltages (and there may be as few as one) are rectified by a multiplicity of rectifiers D2F and D3F and filtered by a filter choke A2F (generally magnetically shared by all outputs) working with a multiplicity of separate filter capacitors C1F, C2F, and C3F to generate output power at nodes E5F, E6F and E7F.

One of the outputs, in this case the output E5F, is chosen to provide voltage feedback for regulation of the outputs E5F, E6F and E7F against variations in AC line voltage and load changes. This feedback voltage at node E3F is fed to a regulating pulse width modulator A4F, which, upon comparison with an internal reference voltage, adjusts the duty cycle of the high speed switches in the DC-to-AC converter A1F in order to achieve a lower or higher average voltage as is necessary to correct for the above mentioned variations. It should be noted that the peak-to-peak voltage observed on any winding of the transformer in the converter A1F is constant for load changes, but the average voltage may be changed through the technique of duty cycle control of the switches. The averaging to a constant output voltage is accomplished by the output filter choke A2F and the capacitors C1F, C2F and C3F. Indeed while the peak transformer voltage is influenced by variations in AC line voltage, the average is subject to the same control scheme. In real world applications, the peak to peak transformer voltage is always greater than the average voltage at the output, and the duty cycle of each switch is commensurately less than 50%. This is an important aspect of the operation of this type of power supply and is critical to the operation of the present invention.

The block diagram of FIG. 5 reveals that the rectifier of one of the outputs has been replaced with a switch/rectifier assembly A3F, and that the switches that are part of the assembly A3F are driven synchronously with those of the DC-to-AC converter A1F. During normal operation from the power line, the switch/rectifier A3F functions as a rectifier, providing the same function as the like rectifiers D2F and D3F.

The pulse width modulator A4F also issues a synchronization pulse to a battery charge control circuit. This circuit is switching in nature;, and modulates a charge switch S1F on and off at a duty cycle determined by feedback from a battery B1F and at the frequency of the pulse width modulator A4F. Remembering that the peak voltage at a node E4F is always higher than its output average, this voltage may be used to charge the battery B1F. Through the use of duty cycle control, the charging profile may be controlled. The battery B1F voltage is chosen to be lower than the lowest peak voltage on the node E4F during normal operation, but higher than that which is required to operate the power supply under line fault conditions when the UPS is supplying power. This means that charging current is always available in normal operation, but that the supply may continue to supply useful output during line faults.

During fault conditions, the voltage at the node E4F falls. Energy is directed from the battery B1F through a charging switch diode D4F to the node E4F. The switches resident in the switch/rectifier assembly A3F drive the power back into the transformer that is part of the DC-to-AC converter A1F through a winding that was previously used to output power. The winding, magnetically coupled to all other windings, produces voltage at all outputs, and just as before, the pulse width modulator A4F regulates the voltage on the outputs E5F, E6F, and E7F. This time however, the switches in the switch/rectifier assembly A3F are the effective control elements.

As a further benefit, rectifiers located in the DC-to-AC converter A1F will "back rectify" the voltage seen on the transformer and keep the large electrolytic capacitors at the input filter charged. This prevents large inrush currents from occurring at the return of line power.

Figure 6:
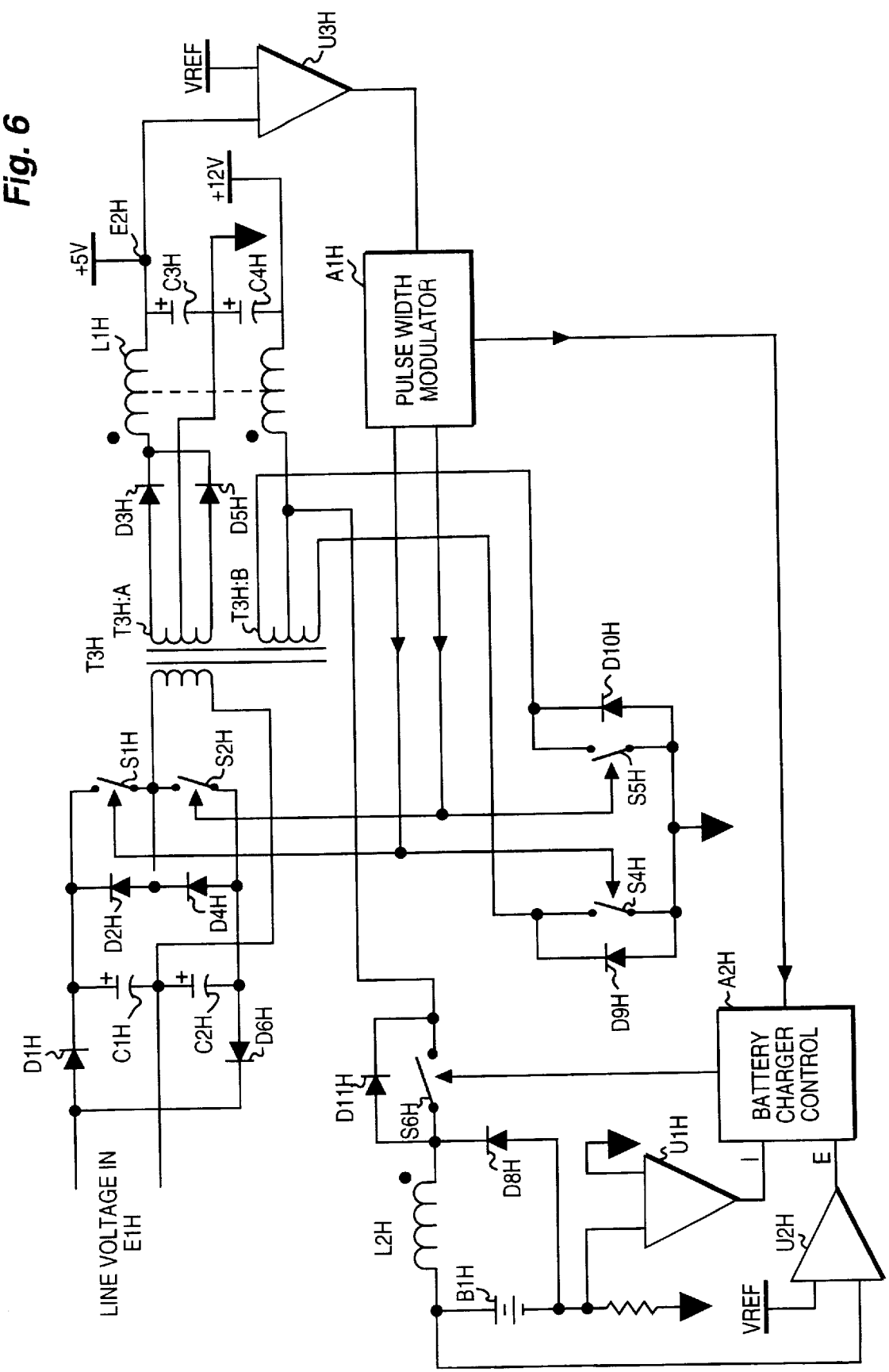
FIG. 6 is a simplified schematic of a dual output power supply with integrated UPS, as shown in FIG. 5.

FIG. 6 is a simplified schematic of a dual output power supply with integrated UPS. AC line voltage at input node E1H is rectified by diodes D1H and D6H and stored on holdup capacitors C1H and C2H. Switches S1H and S2H, under duty cycle control of the pulse width modulator A1H, impress a high frequency AC voltage equal to the voltage on C1H and then C2H across a transformer T3H winding. The output of the transformer T3H is shown as two separate, low voltage outputs through windings T3H:A and T3H:B, although any number of outputs could be available, including only a single output. A pairs of diodes D3H and D5H rectify one of the center tapped low voltage windings of the transformer T3H. The resulting rectified waveform is offered to an inductor L1H and a capacitor C3H for smoothing. The output voltage, represented here as +5 volts, is fed to an output E2H and also to a feedback error amplifier U3H that compares it to a reference voltage (VREF). The amplifier U3H, the reference voltage VREF, and the pulse width modulator A1H are generally part of an integrated pulse width modulator (combined as pulse width modulator A4F in FIG. 5), but are shown separately here for clarity. The resultant output of the amplifier U3H influences the duty cycle of the switches S1H and S2H via the pulse width modulator A1H, which adjusts the output voltage at E2H to coincide closely with the reference voltage VREF.

Because the duty cycle of the switches S1H and S2H, and not the peak voltage amplitude across the transformer T3H is influenced, the peak voltage on the transformer T3H may be substantially higher (but never lower) than the averaged voltage seen at the power supply output. The pulse width modulator A1H simultaneously drives a pair of switches S4H and S5H. Diodes D9H and D10H are rectifiers that perform the same task as the diodes D3H and D5H in the 5 V output at the node E2H. However in this case, the rectifiers D9H and D10H are anode grounded. This has no bearing on the output since the winding of the transformer T3H is fully floating. The polarity of the transformer T3H windings and the conduction of all switches is arranged so that the switches S4H and S5H are on only when the adjacent diode (D9H and D10H respectively) are in conduction. This avoids conduction conflict and actually can improve the rectification efficiency if the switches S4H and S5H are capable of bipolar conduction. Such a device is a power mosfet, which even includes an intrinsic body diode schematically shown separately here. In other words: the switch S4H and the diode D9H may or may not be a single device. If they are, as in a mosfet, there exists a potential efficiency advantage.

As stated previously, the peak voltage across any winding of the transformer T3H will always be higher than the average voltage. Taking advantage of this fact, the center tap peak voltage of the winding T3H:B is chosen to be higher than that of the battery B1H and is attached to the switch S6H and the cathode of the diode D11H. If the switch S6H is turned on synchronously with the switch S4H and S5H, this voltage will be high enough to charge the battery through an inductor L2H, which smoothes the current. Feedback taken from the battery B1H voltage and charging current may be used by a current shunt amplifier U1H and a voltage error amplifier U2H to influence the duty cycle of the switch S6H by a battery charger control A2H. A diode D8H is a catch diode that completes the circuit for continued current flow into the battery when the switch S6H opens. By these means, the battery charger has complete control over the battery charge profile.

Now, if the AC power droops or fails at the input node E1H, the voltage across the transformer T3H will start to fall. When the voltage of the center tap of winding T3H:B falls one diode drop (D11H) below the battery voltage it is "caught" and supported at that level by the battery B1H, this level is designed to be sufficient to keep the power supply operating properly. If the switch S6H and the diode D11H are an integrated package as in a power mosfet, the battery charger control A2H can be arranged to keep the switch S6H closed continuously during a fault. Because a mosfet conducts in both directions, the conduction of the mosfet is added in parallel with that of the diode D11H and may improve the overall efficiency. With the center tap of the second winding T3H:B now fed by the battery B1H, the switches S6H and S5H will now conduct the winding ends alternately to ground. This will impress a voltage in proper ratio on all windings of the transformer T3H. The pulse width modulator A1H and associated components will regulate the duty cycle of the switches S4H and S5H so as to provide the proper output (e.g. at the 5 V output at the node E2H), and the power supply will continue to provide useful output.

Because the voltage is impressed on all windings of the transformer T3H, the high voltage winding, normally associated with the input, also feeds rectified voltage via a pair of diodes D2H and D4H to the capacitors C1H and C2H. This keeps the input filter charged and avoids large current surges when the AC line returns at the node E1H.

It will be obvious to those skilled in the art that many components used in the circuit could be changed within the spirit of the invention Components such as a power mosfet can be substituted with other mosfets that perform the same task. Indeed, the circuit can be easily adapted to use other devices such as bipolar junction transistors, IGBT's, or other applicable devices. Many of these will require separate discrete rectifiers in parallel, but this does not alter the concept. Additionally, many circuit means can be used to drive the power device and control the current. The control and monitoring circuit may be constructed of discrete components or make use of custom or industry standard devices such as an SG2525, IR2151 or IR2152 or any other devices that may accomplish the task without altering the intent of the invention.

UPS Replacement During Computer Operaton

During normal operation, the batteries used in devices of the present invention may lose their ability to retain charge. For example, lead acid batteries are known to have a normal service life of only 3–5 years at normal operating temperatures, and this period may be significantly shortened by heavy usage or high temperatures. Nickel-cadmium (NiCad) batteries tend to have a longer service life, but under certain circumstances they may suffer from "memory" and other effects which greatly impair their performance. Under such circumstances, it becomes necessary to replace the UPS batteries. It may also be of use to replace the entire UPS, including circuitry, either due to malfunctioning, the need to replace a fuse, upgrading, or because the user desires to install a different UPS (e.g. one with a larger capacity, to maintain the computer for a longer period of time).

During replacement of the batteries or the UPS, the computer system may be required to be de-energized. However, for certain computer systems, including server systems or those used in critical systems, such as health care, retail or telecommunications operations, it is important that the computers maintain continuous operation. It is frequently of clear importance to allow the UPS or its batteries to be replaced during normal operation of the equipment protected by the UPS. This capability is called "hot swappability."

FIG. 7a through FIG. 7d are block diagrams of a power supply for electronic equipment with varying degrees of physical integration with a UPS and its batteries. In FIG. 7a, a power supply 37 encloses the UPS power circuit 33 (known also as the bi-directional power converter), the UPS battery 31, and a power supply interface 35 that physically and electrically interfaces the UPS power circuit 33 to the normal power supply circuitry of the power supply 37. In this embodiment, all aspects of the UPS (the circuitry 33 and the battery 31) as well as the interface 35 with the power supply 37 are fully enclosed by a shell 38 of the power supply 37. In order to replace either the UPS battery 31 or the UPS power circuitry 33, the shell 38 would need to be completely or partially removed. For safety reasons, this would require that the external power from a power cord 39 be removed or de-energized and the electronic system supported by the power supply 37 be turned off.

In FIG. 7b, however, the UPS battery 31 is connected to the UPS power circuitry 33 via a detachable electrical and physical connector 45. Furthermore the power supply shell 38 is indented with a concavity wall 43, through which the connector 45 transects. Within the teachings of the present invention, the connector 45 may be permanently attached to the UPS power circuit 33, to the UPS battery 31, or to neither. The detachable connector 45 allows the battery 31 to be physically removed from the power supply 37, and with proper measures, the open connection thus revealed may be made safe to human intrusion by well-known means. By means to be discussed below, the UPS circuitry 33 or the power supply interface 35 can be constructed so that hot-swapping does not interrupt the normal functioning of the power supply 37, even though the lack of the battery 31 means that the UPS cannot supply backup power in case of a power outage.

FIG. 7c shows an embodiment of the present invention wherein the detachable connector 45 resides between the UPS power circuit 33 and the power supply interface 35. This allows both the UPS circuitry 33 and the UPS battery 31 to be removed from the power supply 37. In this case, the concavity wall 43 must be made so that the concavity within the power supply 37 is large enough to accommodate both the UPS power circuit 33 and the UPS battery 31. Optionally, a cover 41 may cover the location of the concavity either to hold the UPS battery 31 and UPS circuitry 33 into the concavity, or to prevent human intrusion when the concavity is empty. The cover 41 may also be used in cases such as FIG. 7b where only the UPS battery 31 is removable.

FIG. 7d illustrates an embodiment where the connector 45 is replaced with a detachable mating cord 47. In this case, the UPS battery 31 and the UPS circuitry 33, or just the UPS battery 31, are electrically connected with the interior of the power supply through the power supply interface 35, but they are only loosely connected physically through the cord. The UPS components attached to the cord may be located outside of the power supply housing 38 altogether, either outside of the computer, or within the computer. This method of attachment is of particular benefit when the size of the circuitry 33 or the battery 31 is large relative to that of the power supply 37. Indeed, the circuitry 33 may be located inside of the computer power supply 37, while the battery 31 may be conveniently located either inside the computer or outside the computer, connected to the circuitry 33 by a detachable electrical cable.

It should be understood that in the same spirit as FIG. 7d, the UPS circuitry 33 may be placed inside the power supply enclosure along with the power supply interface 35, and a cable be used to connect to UPS batteries 31 that are located external to the power supply. Indeed, in FIG. 7a through FIG. 7d, the distinction between the UPS circuitry 33 and the UPS batteries 31 is not entirely well defined, since some amount of electronic circuitry may generally be located with the batteries. This circuitry may include temperature sensing devices to detect temperature overloads during charging or discharging, LED's or other devices to alert the user to system operation or malfunctioning in the batteries, or a fuse to prevent battery fault conditions from damaging other circuitry.

It should be noted that the orientation of the opening of the concavity depicted in FIG. 7b and FIG. 7c may be in any direction with respect to the power supply 37. It is particularly convenient, however, for the opening to face the outside of the computer, so that the removable UPS component may be accessed during normal computer operation without opening the computer housing. In general, this direction will be along the rear wall of the power supply 37 through which the power cable 39 inserts, or the plug that is usually present on the end of the power cord 39 connects with a mated connection on the back of the power supply 37.

Figure 3:
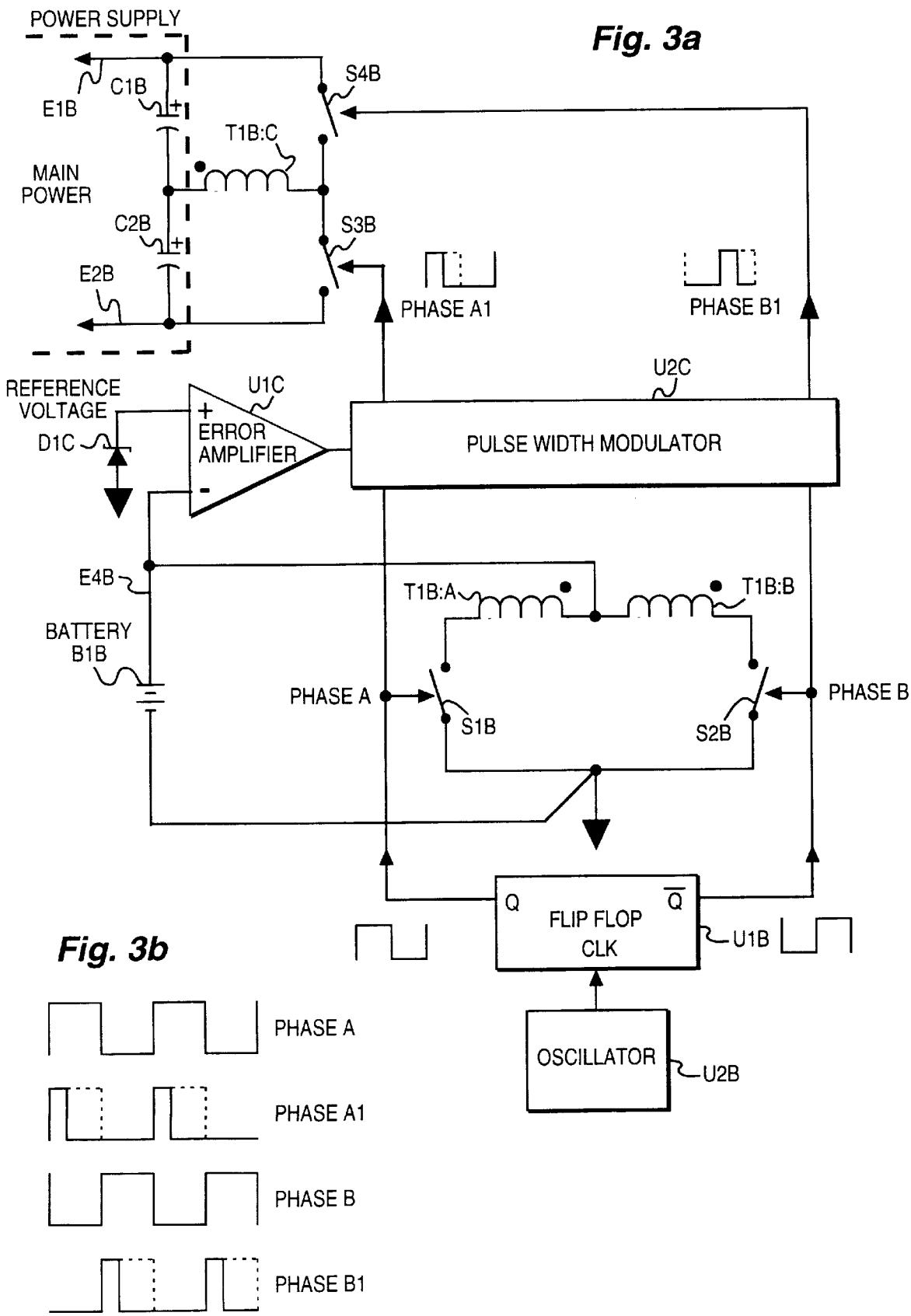

In order for the UPS to be hot-swappable, the electronics must be supportive in that the power supply operation must not be interrupted or otherwise adversely affected by the connection or disconnection of the UPS. In the case where the UPS circuitry and the UPS battery are both hot-swappable, the important issue is that at the nodal point of connection to the power supply, the UPS must not have substantial energy storage devices. Were the UPS to have energy storage capacitors, for example, in addition those of the power supply, connection of the UPS would cause potentially uncontrolled currents and attendant voltage transients when the energy storage capacitors in the power supply discharge into those of the UPS. This is indicated in FIG. 2 and FIG. 3 in that the capacitors located at the input voltage nodes (e.g. capacitors C1B and C2B) are associated with the computer power supply rather than with the UPS. In the case where the battery is hot-swappable from the UPS circuitry, care must be taken to assure that no erroneous modes of circuit operation occur during removal or replacement.

Combined Battery Fuse and Current Stunt

Because batteries can provide a large source of current during fault conditions, it is appropriate to use a fusing element between the battery and all other circuitry. A typical fuse consists of a metallic element possessing a low resistance. Several circuit functions require that the magnitude and direction of current flowing in the battery be ascertained. If the fuse is sized such that its fusing current is higher than that which normally flows in the circuit, and the fuse resistance is relatively constant over this range of currents, the fuse may be used simultaneously as a current sensing or shunt resistor. Several important circuit functions may be implemented by examining the magnitude and direction of the voltage across this shunt during several modes of circuit operation.

Figure 8:
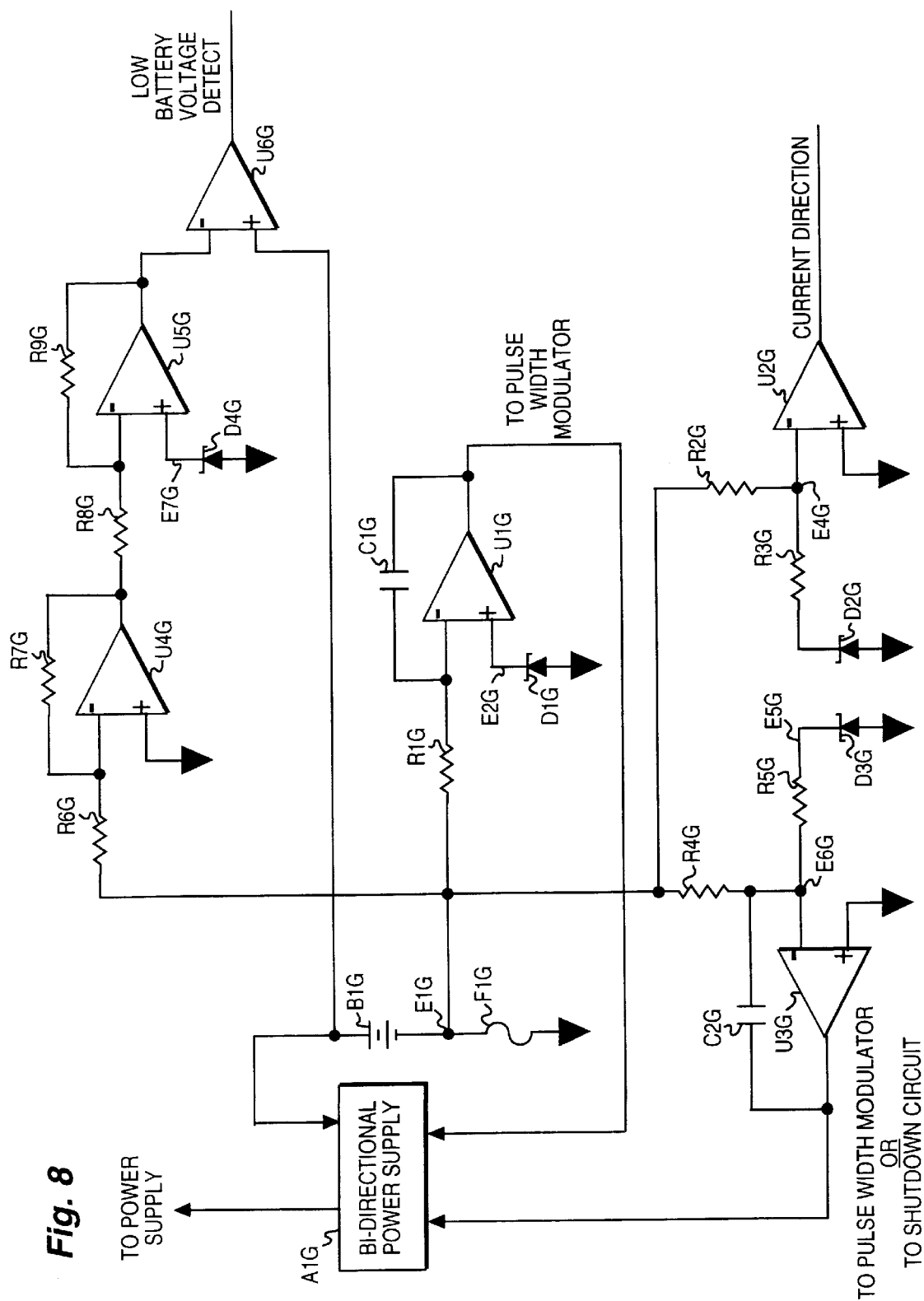
FIG. 8 is a schematic of a circuit in which a battery fuse is used as a current shunt.

FIG. 8 is a schematic of a circuit in which a battery fuse is used as a current shunt. U1G and associated circuitry form a current regulator which holds the magnitude of charging current for the battery B1G constant. When the bi-directional power supply provides charging current to the battery B1G, a combination fuse/shunt resistor F1G develops a voltage proportional to this charging current divided by the fuse F1G's resistance. In FIG. 8, the polarity of this current is such that a positive potential appears at the node E1G. U1G error amplifier compares the voltage at a node E1G with the voltage E2G atop the reference diode D1G. An error amplifier U1G, along with bandwidth determining elements comprising a resistor R1G and capacitor C1G amplify the difference between the voltage at the node E1G and the voltage at the node E2G. The resultant output is passed to the bi-directional power supply. The circuit is so arranged that a signal arising at the output of the error amplifier U1G relating to an increase in the voltage at the node E1G, reduces the current emanating from the bi-directional power supply, thereby stabilizing the current charging the battery B1G, and thus the potential at the node E1G. By this means, regulation of the current charging the battery B1G is achieved.

Within the bi-directional power supply, it is necessary to detect whether current is flowing into or out of the battery. This is necessary in order to set or reset certain circuit functions such as battery charging timers and the like. A comparator U2G along with associated circuitry comprising resistors R2G and R3G, and a diode D2G provide this function by comparing the algebraic sum of voltages from the fuse/current shunt F1G and a reference voltage E3G atop the diode D2G. When the battery is charging, the circuit is so arranged that the algebraic sum of voltages at a node E4G is above zero, the comparator U2G then provides one polarity of output. However, when the battery is discharging, the relative magnitudes and polarities of voltages at the nodes E1G and E3G, seen through the impedances R2G and R3G, is such that the summed voltage at the node E4G is less than zero, and the comparator U2G output changes state.

Excessive battery discharge current is detected by a component U3G and associated circuitry. Voltage at a node E6G is the algebraic sum of voltages at the nodes E1G and E5G, summed through the impedances of resistors R4G and R5G. The circuit and impedances of the resistors R4G and R5G are so arranged that the voltage at the node E6G approaches zero when voltage at the node E1G becomes sufficiently negative in magnitude. The component U3G compares the voltage at the node E6G to zero volts, and if the voltage E6G becomes more negative, the output of the component U3G sends limiting signal to the bi-directional power supply. When the component U3G is embodied as an error amplifier with an output driving a proportional input at the bi-directional power supply, current flowing from the battery may be limited by closed loop regulation of voltage E6G at the input of the component U3G. However, the component U3G may also be configured as a comparator. When the voltage at E6G appears more negative than zero, implying a battery current higher than a given threshold, the output of the component U3G changes state. This state change can be used to halt the bi-directional power supply, stopping all subsequent current flow from the battery. This circuit is used to prevent currents higher than those anticipated for normal operation from occurring during a fault condition.

When the bi-directional power supply is operating on battery power, it is necessary to ascertain when the battery is nearly depleted. At this point, the circuit should initiate final measures in preparation for shutoff. It is possible to detect this point by comparing the diminishing battery voltage to a voltage reference. However, the battery voltage is subject to variation caused by the internal impedance of the battery impacted by the magnitude of the discharge current. Thus, a battery may exhibit a range of voltages at nearly the same point of exhaustion dependent on the rate of discharge. Amplifiers U4G and U5G and a comparator U6G and associated circuitry comprise a low battery voltage detection circuit which compensates for the magnitude of battery discharge current in a battery with a known internal impedance.

The comparator U6G compares the battery voltage to the voltage at the output of the amplifier U5G in order to determine when the battery voltage is low. The amplifier U5G combines the reference voltage at a node E7G atop a diode D4G with a signal arising from the magnitude of current through the battery B1G, as developed by the fuse/shunt resistor F1G. The amplifier U4G scales and inverts the current related voltage so as to produce a variation in the output voltage of the amplifier U5G, which is roughly proportional to the variation in terminal voltage of the battery B1G during varying discharge currents. Thus, the low battery voltage signal at the output of the comparator U6G occurs over a range of battery voltages which in turn occurs over a range of battery discharge currents.

It should be understood that these functions of the fuse/current shunt are separable and independent, so that in any one circuit, a subset of these functions may operate. While some of the functions of the fuse/current shunt may be substituted with a dedicated resistor, the large currents found in normal UPS operation suggest a resistor which is large in physical size and wasteful of power. A fuse, with its large current capabilities and low resistance, is thus a very effective alternative, especially since it will already be required for safety reasons.

DC Voltage Output

Because the bi-directional power supply within the UPS is in constant operation, whether charging the battery or supplying energy to the computer power supply, the bi-directional power supply may also provide DC power to peripheral components outside of the computer proper. FIG. 2 contains the additional circuitry necessary to supply DC power to these peripheral devices, which may include amplified audio speakers, flat-panel video displays (plasma or LCD), modems, and disk or tape data storage devices.

An auxiliary winding T1B:D and associated circuitry comprising a diode D1B and a capacitor C3B provide a coarsely regulated DC voltage at a node E5B. A voltage regulator U2B regulates the voltage at the node E5B and produces at an output E6B a well-regulated voltage suitable for use by external peripheral devices. The voltage regulator U2B further provides current limiting such that an external fault condition does not reflect a fault affecting the operation of the bi-directional power supply.

When multiple output voltages or connections to peripherals requiring the same voltage are desired, this may be accomplished by a number of different means. For example, multiple transformer windings with associated rectifying and regulating circuitry may be utilized, or alternatively, an individual transformer winding may be associated with multiple rectifying and/or regulating components.

Control of UPS Operation

An intrinsic aspect of UPS function is automatic operation—that is, the UPS must automatically work to supply power as needed to the computer in the event of a power failure. Furthermore, those functions in the computer which support UPS function, such as the backup of open computer files and computer memory, must also occur without user intervention. Thus, the UPS and the computer must communicate to ensure the functioning of mutual support.

There are three primary types of communication used in internal UPS functioning. Firstly, the UPS must know the power status of the computer, to distinguish a power outage on the input mains of the computer from the user having turned the computer off. This requires information from the computer to be supplied to the UPS. Secondly, the computer must be advised that a power failure condition has occurred, so that it may initiate software backup of computer files and memory. Lastly, the computer or the UPS must be able to alert the user as to the status and operation of the UPS, so that the user will be able to anticipate or understand UPS activity and associated functions during a power outage. This last form of communication will be described in the next section.

There are, in general, two methods of controlling the power status of the computer. In one method, the power is controlled through the use of a manual switch. These manual switches mechanically disrupt input power. In a second method that has recently become more common, the power is controlled electronically from the motherboard of the computer. In this method, the power may be controlled from software resident on the computer. Additionally, manual switches can be located on the front of the computer or on the keyboard. These switches however, communicate directly with the motherboard, which then communicates with a logic command to the power supply. This second method is known as a "soft power switch."

Figure 9A:
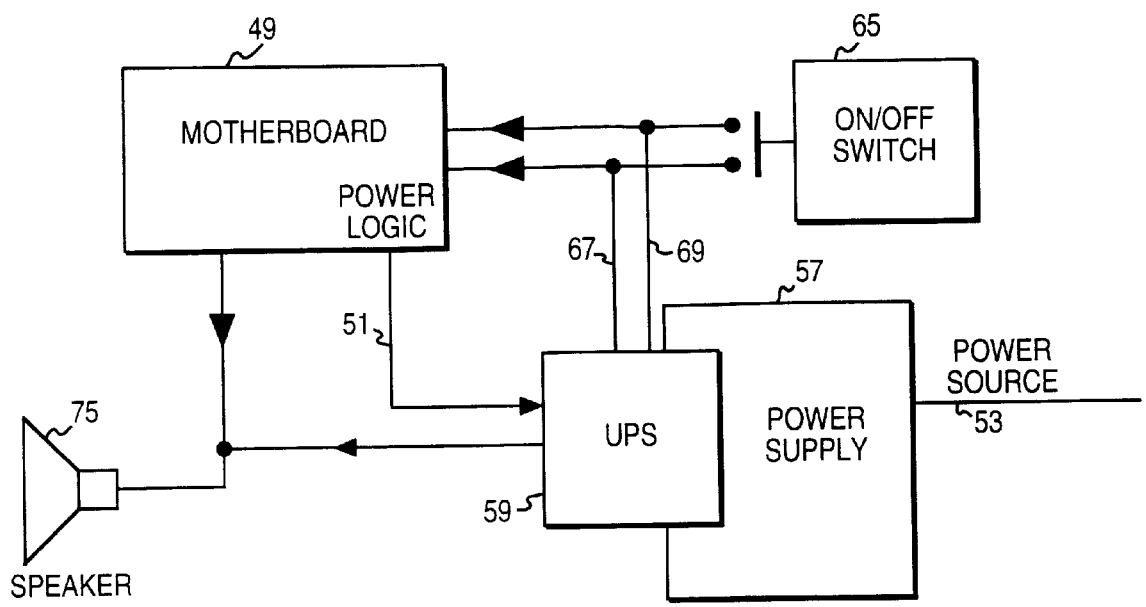
FIG. 9a and FIG. 9b are block diagrams of different forms of communication between the computer and the UPS, as may be carried out in the present invention.
Figure 9B:
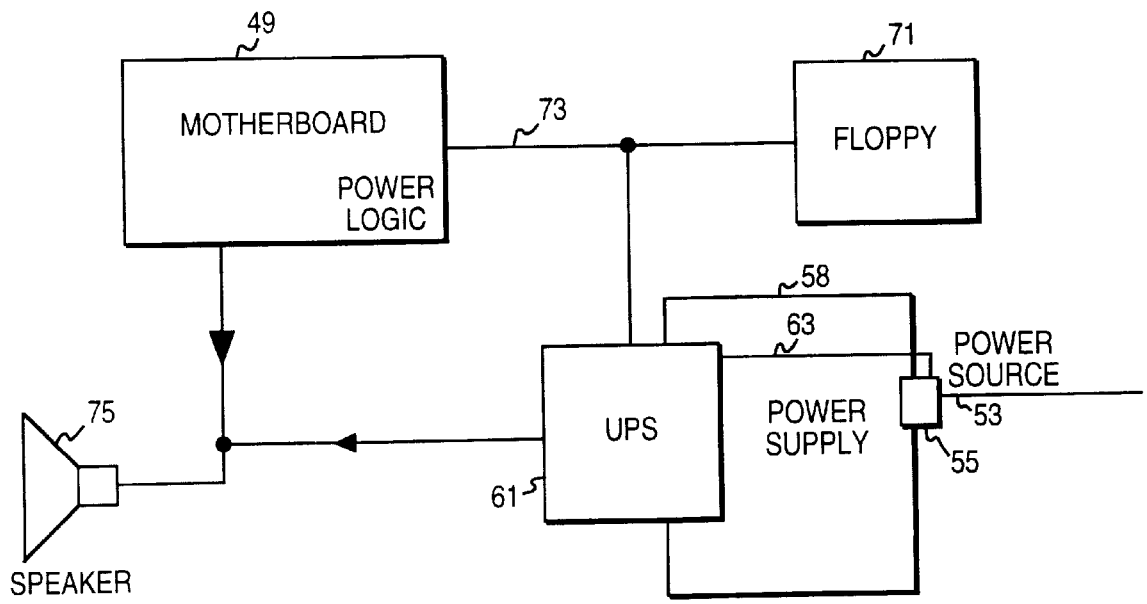

FIG. 9a and FIG. 9b are block diagrams of different forms of communication between the computer and the UPS. In FIG. 9a, the power supply is electronically controlled from a motherboard 49 (from both software and manual switches). When the power logic on the motherboard 49 directs an electronically-controlled power supply 57 to shut down power to the computer, a signal is also sent along a signaling wire 51 to a UPS 59. This informs the UPS 59 that a purposeful shutdown of the system has occurred and inhibits the UPS 59 from supplying power to the computer. However, if mains power on input cable 53 is lost, as in a power failure, the UPS 59 will automatically support computer operation by maintaining power in the computer power supply 57.

In FIG. 9b, a manually-switched power supply 58 interacts with a UPS 61 designed for interaction with such a power supply 58. A manual switch 55 on the power supply 58 controls the power supply 58 operation. If the computer is purposefully shutdown using the manual switch 55, a sensing cable 63, which connects with the mains power on the input side of the switch 55, detects the presence of mains power on input cable 53. This inhibits the UPS from maintaining computer functioning when the user desires to turn off the computer. However, when there is a power failure, this is detected by the UPS 61 through the absence of mains power on the sensing cable 63. In this case, no interaction between the motherboard 49 and the UPS 61 is necessary to initiate UPS function.

Because the UPS can maintain computer operations for only a limited period of time, it is necessary for the computer to backup volatile information for later retrieval in case mains power is not restored before the battery backup of the UPS is exhausted. This requires the UPS to communicate with the computer. Two different methods of performing this communication are indicated in FIG. 9a and FIG. 9b. In FIG. 9a, the UPS 59 is connected in parallel with a momentary switch 65 used to control computer power. Such momentary switches are commonly found on modern computers, and are connected to the logic circuitry on the motherboard 49. Depending on the Basic Input/Output System (BIOS), the motherboard may respond differently to signals from the momentary switch 65. In the case depicted in FIG. 9a, when the momentary switch 65 is closed for a short period of time (on the order of less than 4 seconds), the computer is placed into a suspend mode after a computer backup of all volatile information. The UPS 59 is wired in parallel with the momentary switch 65 to the motherboard 49 through a pair of wires 67 and 69, and may therefore independently mimic the action of the momentary switch 65. After the UPS 59 senses a power failure as described above, it may signal the motherboard 49 by closing the connection across the wires 67 and 69, thus initiating system backup.

In FIG. 9b, the UPS 61 communicates with the motherboard through a logic cable 73, which connects a removable media drive 71 to the motherboard 49. The BIOS software on the motherboard 49 is responsive to changes of state in the signals carried on the logic cable 73, using these to detect such states as the opening of the floppy drive 71 door, the reading or writing of data to the floppy drive 71. By maintaining a parallel electrical connection on the floppy cable 73, the UPS 61 may keep in contact with the motherboard 49. Software resident and operating on the motherboard (e.g. BIOS software or terminate and stay resident programs in memory) are necessary to interpret the signals on the floppy cable 73 and initiate software backup on the computer.

It should be noted that signals from the UPS 61 may interfere with the normal functioning of the floppy drive 71. Thus, it is convenient to make use of connections within the computer that are not being used. Conventional computer cabling generally provides connections for multiple floppy drives, even though only one floppy dive 71 is usually present. Thus, by using a floppy cable 73 that is otherwise unused, it will not cause problems with functioning peripherals in the system.

It is within the spirit of the present invention for other computer peripheral ports to be used by the UPS to signal the motherboard. Other convenient peripheral ports may include internal hard drive, tape drive, and CD ROM drive controller ports. Furthermore, the peripheral ports need not normally be located within the computer enclosure, but may typically be outside or on an outside wall of the enclosure. Thus, serial (e.g. Universal Serial Bus) and parallel ports which are used for communication with external peripherals may be "tapped" with parallel connections within the computer enclosure to allow signals to be transmitted to the motherboard 49.

Alerts and User Interface

In operation, interaction with the user through auditory and visual feedback is important. These cues allow the user to monitor the operation of the UPS, retrieving such information as the proper functioning of the UPS, the amount of time remaining for UPS operation during power outage, the completion status of the software resident on the computer that stores current computer information during a power outage, and the maintenance status of the batteries.

Auditory feedback may comprise both non-verbal sounds (e.g. clicks, beeps, or buzzing), as well as articulated speech (either in a stored binary representation of captured human speech, or computer-synthesized speech). The sounds or speech can be produced either by speakers that are either internal or external to the computer. However, since the sounds will need to be produced during a power outage, and because most external speakers require additional supplied electrical power which may be absent during a power outage, speakers which are powered by the UPS will need to be used. Most computers include a system speaker, either on the motherboard or otherwise located within the computer enclosure, that are used in the absence of external speakers. These speakers may be used, or alternatively, the UPS may itself contain a dedicated speaker, which may comprise either a piezo-material transducer, or a dynamic speaker.

The auditory output may be either to alert the user that a power outage on the main AC power supply input has occurred, or to indicate a fault condition in the UPS. If the output is articulated speech, the nature of the problem may be enunciated, and any actions for the user to take will be indicated. If the output is a sound, the characteristics of the sound (loudness, repetition rate, or frequency) may indicate the nature of the problem. For instance, in the presence of a power outage, with the UPS working properly, a ticking sound may be produced. As the UPS batteries become depleted, the repetition rate may increase, until the sound is extinguished when the UPS is no longer able to support the computer system.

Because of the simplicity of most of the non-articulated sounds, the wave forms may be generated internally within the UPS. In FIG. 9a and FIG. 9b, parallel inputs to a computer speaker 75 are available from either the computer motherboard 49 or the UPS 59. In a fault condition, the UPS 59 may send audio signals directly to the computer speaker, obviating the need for a separate software program to drive the speaker from the computer.

Visual feedback may consist of either indicator lights or video monitor images. Indicator lights will usually be mounted on the UPS itself or on the computer case, and will indicate the operation and status of the UPS. The indication signal can be generated by LED's. Information can be indicated either be the presence or absence of light, or by flashing light signals. For example, an intuitive form of light display would be for an LED to be solidly on when the battery is fully charged, and then flashing when the battery is only partially charged, the rate and amount of flashing roughly proportional to the amount of charge left in the battery. Thus, a fully discharge or malfunctioning battery would be indicated by no indicator light function, while a charging battery would be indicated by a flashing light, that became more insistent (e.g. higher duty cycle) as the battery charged.

For video image feedback to occur, the video monitor must be active. The internal UPS 59 may support monitor operation if a suitable receptacle is available for the external monitor to draw power from the UPS 59. Alternatively, if the monitor and computer are integrated units, the monitor will naturally draw power from the computer power supply. In addition, the ability to supply power through DC power connections supported either by the UPS 59 or the computer power supply 57 will make power available to external video monitors that use DC power. Such monitors include many of the flat-screen LCD and color plasma monitors now becoming available.

The video feedback to the user will be generated through a software program resident on the motherboard. This backup software program w,ill become activated, as described in the previous section, through signals from the UPS 59 to the motherboard 49. During the course of the backup, progress can be indicated to the user, as well as providing information as to the amount of electrical backup energy left in the computer battery.

Maintenance Battery

Batteries for use in the UPS of the present invention can be of various types, differing in size, topology, chemistry and various performance characteristics. Lead-acid batteries are most commonly used in uninterruptible power supplies, because of their moderate energy and power densities, and their low costs. The favorable characteristics of these batteries however, must be balanced against disadvantageous characteristics, among the most notable being the high self-discharge rate and their inability to easily recover from complete discharge. Thus, depending on the construction of a lead-acid battery, it may have a shelf life of only six to twelve months, and at the end of this shelf life, it may be unable to be fully charged thereafter (service life with recharging is generally 3–5 years for these batteries).

If batteries with a short shelf life are used due to their other favorable characteristics (e.g. lead-acid batteries), it is convenient to have a method of extending their shelf life so as to be able to accommodate a wide variety of different distribution and sales avenues. The method of the present invention allows the use of a second battery, called a "maintenance battery", with a shelf life considerably longer than the main storage battery. FIG. 10*a* is a schematic showing a main storage battery B2E connected in parallel with a maintenance battery B1E. As the storage battery B2E self-discharges during storage, the maintenance battery B1E discharges into the battery B2E through a resistor R1E and thereby compensates for self-discharge of the storage battery B2E. A diode D1E, optionally present depending on the relative types of batteries B1E and B2E, prevents the maintenance battery B1E from being recharged during normal operation, because charging the battery B1E might interfere with a charging regime optimized for the storage battery B2E, and because the maintenance battery B1E may be of a non-rechargeable chemistry.

The characteristics of the maintenance battery B1E must be carefully matched with the storage battery B2E. For example, the operating voltage of the maintenance battery B1E must be higher than that of the completely discharged storage battery B2E, in order to prevent complete discharge of the storage battery B2E. Furthermore, the capacity of the maintenance battery B1E must be high enough to provide meaningful extension of the lifetime of the storage battery B2E.

It may be desired that the maintenance battery B1E is not a permanent part of the UPS, and that it be used only for distribution and sales of the UPS prior to operation, or during periods of long-term quiescence. In such case, the maintenance battery B1E may not be resident within the UPS, but be connected in such a way as to be detached prior to operation of the UPS.

FIG. 10*b* is a schematic depicting the use of a maintenance battery, as in FIG. 10*a*, except in this case, the maintenance battery is a rechargeable battery. As before, the characteristics of the two batteries, the main storage battery B2E and a rechargeable maintenance battery B3E, may be very different. In this case, the maintenance battery may be charged, but because its electrical properties may be different from that of the storage battery B2E, a boost circuit A1E must convert the power normally used for the storage battery B2E to that which can be used by the maintenance battery B3E.

When the UPS is not energized, current trickles through a resistor R2E from the maintenance battery B3E in order to maintain a minimum sustaining voltage on the storage battery B2E, preventing the battery B2E from falling into a state of terminal and irreversible discharge from which it cannot recover. When the UPS is energized, the current path through the resistor R2E is minimal, and the principal current source is from the main storage battery B2E, which is normally chosen for its low internal impedance relative to that of the maintenance battery B3E.

It may be convenient for the circuitry depicted in FIG. 10*b* to be physically contained within a single enclosure, providing a single battery interface with a hybrid capability. The use of a single enclosure involves two advantages. Firstly, the installation and replacement of the combined batteries is facilitated. Additionally, the combined battery enclosure may be made equal in size to existing common battery sizes, allowing the direct replacement of other battery types with the hybrid battery described here.

It should be noted that there are a wide variety of battery types, and that the need for maintenance batteries may extend beyond lead-acid storage batteries to any battery type with significant self-discharge along with a difficulty to completely recover from a discharged state. Furthermore, it should also be noted that the maintenance battery B1E may be chosen from a number of different chemistries, and does not necessarily need to be rechargeable. Also, it is conceivable that the maintenance battery might be of the same general chemistry as the storage battery (e.g. both be lead-acid batteries), albeit of a chemistry and topology with longer shelf life than that of the main storage battery.

Benefits and Advantages of the Present Invention

In light of these and other examples of prior art, the present invention provides a number of advantages relative to uninterruptible power supplies practiced in the prior art, including:

The UPS has a very simple and limited interface with the normal power supply to which it is connected. For example, in the first embodiment, the interface comprises a single pair of wires between the bi-directional power converter and the DC rail of the power supply. This means that existing power supply designs, which are a mature technology possessing a high degree of reliability coupled with low cost, need not be extensively redesigned or modified to accommodate the present invention. Furthermore, the invention can be easily adapted to almost any power supply that involves a DC rail.

a The bi-directional power converter of the UPS accomplishes both charging and discharging using only a single magnetic component (e.g. the transformer T3H of FIG. 6). In many other designs for uninterruptible power supplies, charging and discharging of the battery involve different electronic circuitry, and thus more than one magnetic component. The single magnetic component of the present invention is both inexpensive, and perhaps more importantly, occupies less volume, so as to facilitate placement in existing power supply topologies.

The invention inherently provides very substantial charge current for a battery or other restorable energy source. In practice, these charging currents can easily be as high as 10 or 20 amperes, so that batteries capable of accepting very large charging currents (for example, the Thin Metal Film lead-acid batteries from Bolder Technologies, Golden, Colorado) can be charged very quickly. This means that subsequent failures of the primary source can be protected against without substantial recharging delays.

The UPS is always in operation supporting the protected power supply. This obviates the sensing and switching circuitry to substitute one source of power for another often seen in the prior art. If the primary source of power begins to fail, the secondary source is already present and immediately maintains the power supply without delay (i.e. switchover time) or sensing/switching circuits. It should be noted that the UPS of the present invention not only protects against faults, but continuously guards against low voltage power "drooping" and "dropouts."

The UPS can fail catastrophically without halting or damaging the supply to which it is attached. This is significant, since reliability is perhaps the most important parameter in power supply design. Thus, the UPS does not introduce new modes of failure which threaten the integrity of computer data or hardware.

The design of the UPS inherently allows placement of the UPS within the available free space of a conventional power supply. The placement of the UPS internally within the power supply presents a number of advantages. For instance, because the UPS may use the power supply enclosure, the cost of UPS packaging may be unnecessary or greatly reduced. In addition, the cost of cables and connectors inherent in an external UPS design are obviated. An internal UPS may furthermore take advantage of the availability of multiple modes of communication available to an internal component, for instance making direct electrical connection with the motherboard, power switches, or internal peripheral ports (e.g. floppy cables) that are not available to external devices. The convenience for the user is also apparent, in that desktop space, floor space and extra cabling is unnecessary for an internal UPS.

The simple interface between the UPS and the computer power supply facilitates the removal of the UPS. With a small number of connections between the UPS and the power supply, the design of a removable UPS is greatly simplified. Furthermore, the design supports "hot-swappability", which allows the replacement of the UPS or the UPS battery while the computer is operational. While this may be simply a convenience for home operations, for many operations (e.g. servers, medical devices, and commercial equipment) the ability to replace batteries during computer operations is mission critical.

The design of the UPS allows the use of a variety of different batteries, both in terms of their chemistry (e.g. lead-acid versus NiCad) and their specific topologies and characteristics. This flexibility allows specific UPS embodiments within the present invention to be designed for different applications. Furthermore, the use of the maintenance battery further broadens the characteristics of the batteries that may be used.

It should be apparent to one skilled in the art that the above-mentioned embodiments are merely illustrations of a few of the many possible specific embodiments of the present invention. Numerous and varied other arrangements can be readily devised by those skilled in the art without departing from the spirit and scope of the invention.

What is claimed is:

1. An uninterruptible power supply for a source of DC power comprising:

(a) a restorable source of stored energy wherein the energy may be released and restored in DC electrical form; and (b) a bi-directional converter including a transformer device having a turns ratio, and a plurality of switch devices that change between open and closed states to couple the stored energy source to the DC power source, wherein the power converter continuously operates, directing energy either toward the source of DC power from the source of stored energy or toward the source of stored energy from the source of DC power, wherein the direction of electrical energy flow depends upon the deviation of the ratio of the potential of the source of DC power and the potential of the source of stored energy from a predetermined ratio that is related to said turns ratio, and in which the direction of DC electrical energy is independent of said states of said switch devices.

2. The uninterruptible power supply of claim 1 wherein the restorable source of stored energy is a rechargeable battery.

3. The uninterruptible power supply of claim 1 wherein the source of DC power is the source of rectified DC voltage at the input of a switching power supply.

4. The uninterruptible power supply of claim 1 wherein the energy directed between the source of DC power and the source of stored energy is in the form of electrical current, wherein the magnitude of current directed toward the source of DC power from the source of stored energy or toward the source of stored energy from the source of DC power is controllable.

5. The uninterruptible power supply of claim 4 wherein the magnitude of current is controlled through means of pulse width modulation.

6. The uninterruptible power supply of claim 4 wherein the magnitude of current is controlled through duty cycle modulation at substantially constant frequency of substantially constant pulse widths.

7. The uninterruptible power supply of claim 4 wherein the magnitude of current is controlled through frequency modulation of substantially constant pulse widths.

8. The uninterruptible power supply of claim 1 wherein the restorable source of stored energy may be disconnected from the bi-directional power converter without interrupting the proper operation of devices that draw power from the source of DC power.

9. The uninterruptible power supply of claim 1 wherein the bi-directional power converter may be disconnected from the source of DC power without interrupting the proper operation of devices which draw power from the source of DC power.

10. The uninterruptible power supply of claim 9 wherein when the bi-directional power converter is disconnected from the DC power source, the bi-directional power converter contains less than 75% of the stored energy of the DC power source.

11. The uninterruptible power supply of claim 1, wherein the energy directed between the source of DC power and the source of stored energy is in the form of electrical current, wherein the magnitude of electrical current made available in either direction is greater than or equal to the inverse of the predetermined ratio of the potential of the source of DC power and the potential of the source of stored energy used in determining current direction.

12. The uninterruptible power supply of claim 11, wherein the magnitude of electrical current that can flow in the direction of the source of stored energy is greater than 10 amperes.

13. The uninterruptible power supply of claim 1, wherein the source of stored energy is maintained in parallel with a second source of stored energy.

14. The uninterruptible power supply of claim 13, wherein the second source of stored energy is connected through a unidirectional current device.

15. The uninterruptible power supply of claim 13, wherein the second source of stored energy is restorable.

16. The uninterruptible power supply of claim 1, wherein the source of DC power is a computer power supply located in a computer.

17. The uninterruptible power supply of claim 16, wherein the uninterruptible power supply is contained within the enclosure of the computer power supply.

18. The uninterruptible power supply of claim 16, wherein the uninterruptible power supply detects inadequate cooling within the computer power supply within which it is contained, and causes an alert to be produced that is from the set comprising audible and visual alerts.

19. The uninterruptible power supply of claim 16, wherein the uninterruptible power supply is removable from computer power supply while the power supply is energized.

20. The uninterruptible power supply of claim 16, wherein the restorable source of stored energy is removable while the power supply is energized.

21. The uninterruptible power supply of claim 16, wherein the uninterruptible power supply is accessible from the outside of the computer.

22. The uninterruptible power supply of claim 16, wherein the restorable source of stored energy is accessible from the outside of the computer.

23. The uninterruptible power supply of claim 16, wherein the restorable source of stored energy is connected to the computer power supply by an electrically conductive cable of which at least some of the cable is external to the computer power supply, and which is distinct from that of the AC mains power cable.

24. The uninterruptible power supply of claim 1, wherein the source of DC power is the unfiltered output of a switching power supply.

25. The uninterruptible power supply of claim 24, wherein the energy directed towards the restorable source of stored energy is derived from the unfiltered output of a winding of the switching power supply transformer.

26. The uninterruptible power supply of claim 1, wherein a portion of the energy is diverted from the bi-directional power converter and is adapted for use by external electrical devices.

27. The uninterruptible power supply of claim 26, wherein the diversion of power is accomplished by using at least one winding on a transformer.

28. The uninterruptible power supply of claim 1, wherein a single electronic component is used concurrently as a fuse and as a resistor developing a voltage proportional to current flowing in the restorable source of stored energy.

29. The uninterruptible power supply of claim 28, wherein the proportional voltage developed across the electrical component is used in regulating the current restoring the energy to the restorable source.

30. The uninterruptible power supply of claim 28, wherein the proportional voltage developed across the electrical component is used in detecting the direction of current in the restorable source of stored energy.

31. The uninterruptible power supply of claim 28, wherein the proportional voltage developed across the electrical component is used in detecting whether the level of current flowing in the restorable source of stored energy is at least a predetermined level of current.

32. The uninterruptible power supply of claim 28, wherein the proportional voltage developed across the electrical component is used in modifying a predetermined value representing the approach of energy depletion of the restorable source of stored energy.

33. The uninterruptible power supply of claim 1, wherein a voltage proportional to current flowing in the restorable source of stored energy is developed across an electrical component and is used in modifying a predetermined value representing the approach of energy depletion of the restorable source of stored energy.

34. The uninterruptible power supply of claim 1, wherein operation is not initiated unless voltage is present at the source of DC power and a signal from the computer representing energization of the power equipment is present.

35. The uninterruptible power supply of claim 1, wherein operation is terminated when the signal representing energization of the power equipment is absent.

36. The uninterruptible power supply of claim 1, wherein communication from the uninterruptible power supply to the computer motherboard is mediated through a cable intended for connection with an internal peripheral.

37. The uninterruptible power supply of claim 1, wherein communication from the uninterruptible power supply to the computer motherboard is mediated by a connection in parallel with a mechanical switch used to initiate system shutdown.

38. The uninterruptible power supply of claim 1, wherein the power supply generates audio signals that are enunciated by a computer system speaker, and wherein the wires connecting to the speaker are in parallel with other wires connected to the speaker.

39. The uninterruptible power supply of claim 1 wherein each of said plurality switch devices continuously operates between said open and closed states.

40. A method of providing redundant power to a source of DC power, comprising the steps of:

(a) providing a source of restorable stored energy; and (b) coupling the restorable stored energy source to the DC power source in a manner to direct energy either toward the source of DC power from the source of stored energy or toward the source of stored energy from the source of DC power using a plurality of switch devices that change between open and closed states, wherein the direction of electrical energy flow depends upon the deviation of the ratio of the potential of the source of DC power and the potential of the source of stored energy from a predetermined ratio and in which the direction of DC electrical energy is independent of said states of said switch devices.

41. An apparatus for providing redundant power to a source of DC power, comprising:

(a) means for providing a source of restorable stored energy; and (b) means for coupling, which includes means for transforming having a turns ratio, the restorable stored energy source to the DC power source in a manner to direct energy either toward the source of DC power from the source of stored energy or toward the source of stored energy from the source of DC power, wherein the direction of electrical energy flow depends upon the deviation of the ratio of the potential of the source of DC power and the potential of the source of stored energy from a predetermined ratio that is related to said turns ratio.

42. The apparatus of claim 41, wherein, whenever the potential of the source of DC power is equal to the potential of the source of stored energy based on said turns ratio, no deviation exists.

* * * * *